(12) United States Patent
Nishio et al.

(10) Patent No.: US 8,401,051 B2
(45) Date of Patent: *Mar. 19, 2013

(54) BASE STATION APPARATUS THAT COMMUNICATES WITH MOBILE STATION APPARATUSES, MOBILE STATION APPARATUS THAT COMMUNICATES WITH A BASE STATION AND TRANSMISSION BAND SETTING METHOD PERFORMED IN A BASE STATION

(75) Inventors: Akihiko Nishio, Osaka (JP); Isamu Yoshii, Osaka (JP); Takahisa Aoyama, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/311,292

(22) Filed: Dec. 5, 2011

(65) Prior Publication Data

US 2012/0140720 A1 Jun. 7, 2012

Related U.S. Application Data

(63) Continuation of application No. 12/160,193, filed as application No. PCT/JP2007/050169 on Jan. 10, 2007, now Pat. No. 8,094,738.

(30) Foreign Application Priority Data

Jan. 11, 2006 (JP) ................................. 2006-004157
Oct. 6, 2006 (JP) ................................. 2006-275639

(51) Int. Cl.
*H04B 1/713* (2011.01)
(52) U.S. Cl. ..................................................... 375/132

(58) Field of Classification Search ................... 375/260, 375/132, 133, 135
See application file for complete search history.

(56) References Cited

U.S. PATENT DOCUMENTS

| 5,887,023 | A | * | 3/1999 | Mabuchi | ........................ 375/133 |
| 5,995,147 | A | | 11/1999 | Suzuki | |
| 2003/0152178 | A1 | | 8/2003 | Tanno | |
| 2003/0224731 | A1 | * | 12/2003 | Yamaura et al. | ............. 455/63.3 |

(Continued)

FOREIGN PATENT DOCUMENTS

| JP | 10-066039 | 3/1998 |
| JP | 11-136178 | 5/1999 |

(Continued)

OTHER PUBLICATIONS

International Search Report dated Apr. 17, 2007.

(Continued)

*Primary Examiner* — Don N Vo
(74) *Attorney, Agent, or Firm* — Dickinson Wright PLLC

(57) ABSTRACT

A base station effectively transmits BCH data and includes an encoding unit for encoding the BCH data; a modulation unit for modulating the BCH data after being encoded; a transmission band setting unit for setting a BCH data transmission band in one of sub carriers constituting an OFDM symbol; encoding units for encoding user data, modulation units for modulating user data after being encoded; and an IFFT unit for mapping the BCH data and the user data to each of the sub carriers and performing IFFT to generate an OFDM symbol. Here, the IFFT unit maps the BCH data to the sub carrier existing in the transmission band set by the transmission band setting unit among the plurality of sub carriers.

7 Claims, 19 Drawing Sheets

U.S. PATENT DOCUMENTS

| | | | |
|---|---|---|---|
| 2004/0170148 A1* | 9/2004 | Parkkinen et al. | 370/337 |
| 2004/0190640 A1 | 9/2004 | Dubuc | |
| 2005/0111429 A1* | 5/2005 | Kim et al. | 370/344 |
| 2005/0281189 A1* | 12/2005 | Lee et al. | 370/208 |
| 2006/0094363 A1* | 5/2006 | Kang et al. | 455/63.1 |
| 2007/0060178 A1 | 3/2007 | Gorokhov | |
| 2010/0097998 A1 | 4/2010 | Nishio | |

FOREIGN PATENT DOCUMENTS

| | | |
|---|---|---|
| JP | 2003-244763 | 8/2003 |

OTHER PUBLICATIONS

3GPP TSG RAN WG1 Ad Hoc on LTE, R1-050590, NTT DoCoMo, "Physical Channels and Multiplexing in Evolved UTRA Downlink," Jun. 21, 2005. p. 4, Line 8.

3GPP TSG RAN WG1 #42bis, NTT DoCoMo, Fujitsu, Mitsubishi Electric Corp., NEC, Panasonic, SHARP, Toshiba Corp., R1-051147 "Basic Structure of Control Channel and Synchronization Channel for Scalable Bandwidth in Evolved UTRA Downlink," Oct. 14, 2005.

* cited by examiner

BASE STATION APPARATUS THAT COMMUNICATES WITH MOBILE STATION APPARATUSES, MOBILE STATION APPARATUS THAT COMMUNICATES WITH A BASE STATION AND TRANSMISSION BAND SETTING METHOD PERFORMED IN A BASE STATION

This is a continuation application of application Ser. No. 12/160,193 filed Jul. 7, 2008, which is a national stage of PCT/JP2007/050169 filed Jan. 10, 2007, which is based on Japanese Application No. 2006-004157 filed Jan. 11, 2006 and Japanese Application No. 2006-275639 filed Oct. 6, 2006, the entire contents of each of which are incorporated by reference herein.

TECHNICAL FIELD

The present invention relates to a radio communication base station apparatus and a method for setting a transmission band for a broadcast channel signal.

BACKGROUND ART

In recent years, in radio communication, particularly in mobile communication, various kinds of information such as images and data other than speech have become targets of transmission. In the future, there will be a growing demand for transmission of various content, and so there will be a growing need for high speed transmission. However, when high speed transmission is performed in mobile communication, the influence of delay waves due to multipath cannot be ignored, and transmission characteristics degrade due to frequency selective fading.

As one of the techniques for combating frequency selective fading, attention is focused on multicarrier communication such as OFDM (Orthogonal Frequency Division Multiplexing). Multicarrier communication transmits data using a plurality of carriers (subcarriers) with the transmission rate lowered to a degree not causing frequency selective fading, and thereby performs high speed transmission. Particularly, in the OFDM scheme, a plurality of subcarriers where data is arranged are orthogonal to each other, and so high frequency efficiency can be achieved among multicarrier communication. Further, the OFDM scheme can be realized using a relatively simple hardware configuration, and so attention is focused on the OFDM scheme particularly, and various study is underway.

In the 3GPP LTE standardization, study is underway to make it possible to use a plurality of radio communication mobile station apparatuses (hereinafter abbreviated as "mobile stations") with different frequency bandwidths (hereinafter abbreviated as "bandwidths") in a mobile communication system of the OFDM scheme. Such a mobile communication system is often referred to as a "scalable bandwidth communication system." For example, in a scalable bandwidth communication system having a frequency band (hereinafter abbreviated as "band") of 20 MHz, a mobile station capable of communicating at one of 5 MHz, 10 MHz and 20 MHz, can be used. Hereinafter, a mobile station capable of communicating at 5 MHz, a mobile station capable of communicating at 10 MHz and a mobile station capable of communicating at 20 MHz are referred to as a "5 MHz mobile station," "10 MHz mobile station" and "20 MHz mobile station," respectively. Further, out of the three types of mobile stations that can be used, a mobile station with the minimum communication capability is referred to as a "minimum capability mobile station." Therefore, in this case, the 5 MHz mobile station is the minimum capability mobile station. In such a scalable bandwidth communication system, the 5 MHz mobile station is assigned a 5 MHz bandwidth in the 20 MHz band and performs communication. Further, the 20 MHz mobile station can perform communication using the whole of the 20 MHz band and so can perform communication at higher speed.

On the other hand, in a mobile communication system adopting the cellular scheme, a radio communication base station apparatus (hereinafter abbreviated as "base station") broadcasts per cell, information required for communicating user data, to all the mobile stations in the cell. This broadcast information is transmitted using a BCH (Broadcast CHannel). The BCH is one of common control channels in downlink and transmits broadcast information such as system information, cell information and transmission parameters, and the like. The broadcast information transmitted using the BCH is hereinafter referred to as "BCH data." Mobile stations receive BCH data upon power activation, learn system information, cell information, transmission parameters, and the like, and then start communicating user data. Further, the transmission parameters such as frame formats are updated over time, and so mobile stations need to receive BCH data even while communicating user data.

As a method for transmitting BCH data in the above-described scalable bandwidth communication system, as shown in the upper part of FIG. 1, transmitting BCH data using the center frequency band (1.25 MHz bandwidth) of 20 MHz band, is proposed (see Non-Patent Document 1). As shown in the upper part of FIG. 1, in this scalable bandwidth communication system, in accordance with a bandwidth (5 MHz) in which the minimum capability mobile station can perform communication, a 20 MHz band is equally divided into four bands FB1 to FB4 per 5 MHz bandwidth. The minimum capability mobile station is assigned one of the bands FB1 to FB4 and communicates user data. Here, one frame is 10 ms and is comprised of 5-20 subframes. BCH data is transmitted once per one frame using one of the subframes. Further, the content of BCH data is updated in a relatively long cycle of approximately 100 frames.

Non-Patent Document 1: 3GPP RAN WG1 Ad Hoc on LTE meeting(2005.06) R1-050590 "Physical Channels and Multiplexing in Evolved UTRA Downlink"

DISCLOSURE OF INVENTION

Problems to be Solved by the Invention

As described above, the minimum capability mobile station is assigned one of the bands FB1 to FB4 and communicates user data.

Therefore, as shown in the lower part of FIG. 1, to receive BCH data while receiving user data, the minimum capability mobile station assigned with, for example, FB1, has to switch the reception frequency while receiving user data. That is, the minimum capability mobile station that communicates user data using FB1, needs to switch the reception frequency from FB1 for receiving user data, to the center frequency band (1.25 MHz bandwidth) of 20 MHz band to receive BCH data, and, then switch the reception frequency from the center frequency to FB1 again to receive user data. This switching of the reception frequency requires time of approximately one subframe each, and so the minimum capability mobile station cannot receive user data in three subframes. Therefore, user throughput decreases.

Further, when all the mobile stations switch the reception frequency at the same time to receive BCH data, the base station cannot transmit user data at all in the meantime (in three subframes). Therefore, the system throughput decreases.

Further, the minimum capability mobile station needs to switch the reception frequency to receive BCH data, and so the amount of processing at the mobile stations increases and power consumption also increases.

To solve these problems caused by the switching of reception frequency, as shown in FIG. 2, BCH data may be transmitted in every frame in all bands FB1 to FB4. However, this substantially reduces communication resources that can be used for user data.

Therefore, as shown in FIG. 3, intervals for transmitting BCH data may be extended compared to those in FIG. 2. However, BCH data is still transmitted at the same timing in all bands FB1 to FB4, and so peak power of BCH data becomes large. Peak power becomes extremely large in BCH data which is transmitted with large power so as to be received at the mobile station located at the cell boundary. Such an increase in peak power causes distortion of the transmission signal and degrades error rate performances. To prevent degradation of error rate performances, the base station needs to have a high-performance amplifier with a large linear region, and, as a result, cost for manufacturing a base station increases.

It is therefore an object of the present invention to provide a base station that can solve the above problems and transmit BCH data efficiently and a method for setting a transmission band for a broadcast channel signal.

Means for Solving the Problem

The base station of the present invention transmits a multicarrier signal comprised of a plurality of subcarriers, and has: a setting section that sets a transmission band for a broadcast channel signal to one of a plurality of first frequency bands in a second frequency band, the second frequency band being divided into the plurality of first frequency bands per bandwidth in which a radio communication mobile station apparatus with a minimum capability can perform communication; a generating section that generate the multicarrier signal by mapping the broadcast channel signal on subcarriers in the transmission band set by the setting section out of the plurality of subcarriers; and a transmitting section that transmits the multicarrier signal to the radio communication mobile station apparatus, and in the base station, the setting section changes over time the first frequency band in which the transmission band is set in the second frequency band.

Advantageous Effect of the Invention

According to the present invention, it is possible to transmit BCH data efficiently.

BEST MODE FOR CARRYING OUT THE INVENTION

Embodiments of the present invention will be described in detail below with reference to the accompanying drawings. Although the OFDM scheme will be described as an example of a multicarrier communication scheme in the following description, the present invention is not limited to the OFDM scheme.

Embodiment 1

Figure 4:
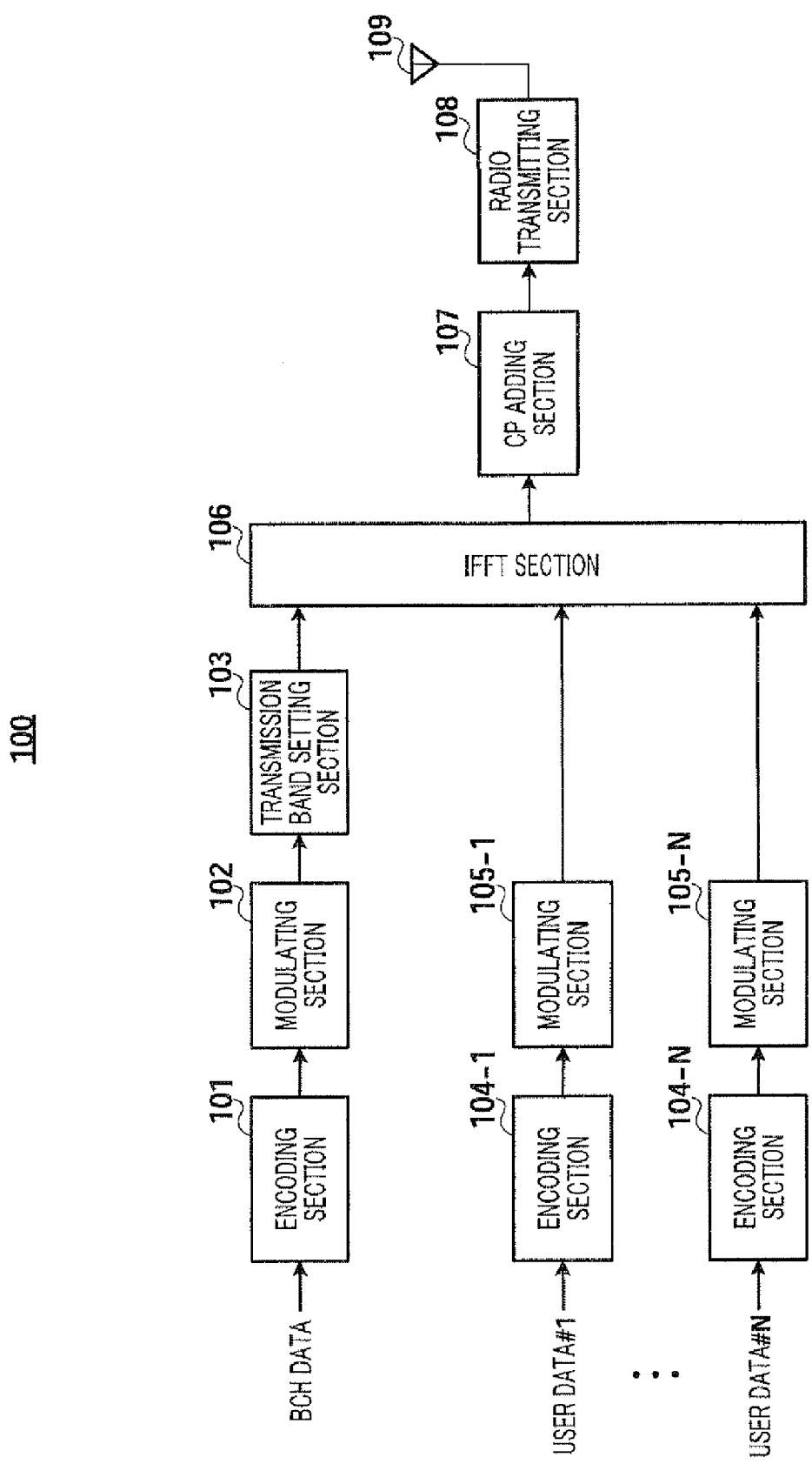
FIG. 4 is a block diagram showing the configuration of a base station according to Embodiment 1 of the present invention.

FIG. 4 shows the configuration of base station 100 according to the present embodiment.

Encoding section 101 encodes BCH data.

Modulating section 102 modulates the encoded BCH data.

Transmission band setting section 103 sets BCH data transmission band. Transmission band setting section 103 sets the BCH data transmission band to one of a plurality of subcarriers forming an OFDM symbol, which is a multicarrier signal. This transmission band setting will be described in detail below.

Encoding sections 104-1 to 104-N and modulating sections 105-1 to 105-N are provided so as to support mobile stations #1 to #N, respectively, to which base station 100 transmits user data.

Encoding sections 104-1 to 104-N encode user data #1 to #N, respectively.

Modulating sections 105-1 to 105-N modulate encoded user data #1 to #N, respectively.

IFFT section 106 maps BCH data and user data #1 to #N on subcarriers #1 to #K, performs an IFFT (Inverse Fast Fourier Transform) and generates an OFDM symbol. IFFT section 106 maps the BCH data on subcarriers in the transmission band set by transmission band setting section 103 out of a plurality of subcarriers 41 to #K.

The OFDM symbol generated in this way is subjected to predetermined radio processing such as up-conversion in radio transmitting section 108 after a cyclic prefix is added in CP adding section 107, and is transmitted by radio to mobile stations #1 to #N via antenna 109.

Figure 5:
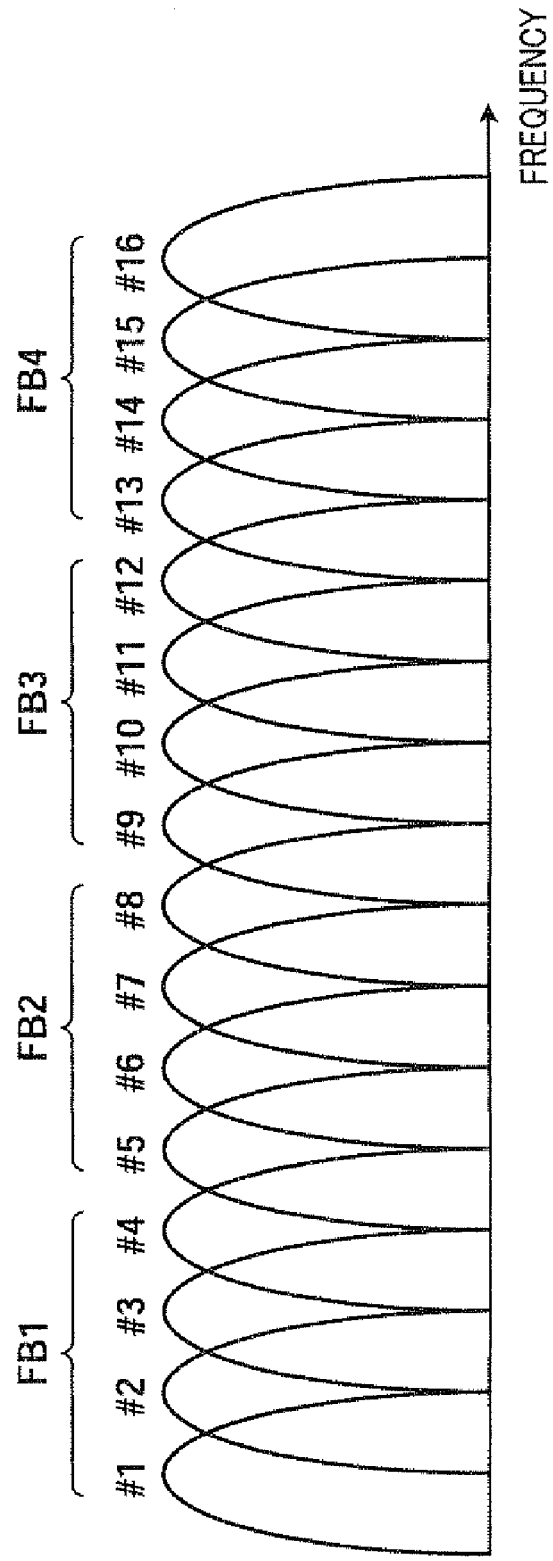
FIG. 5 shows an example of an OFDM symbol according to Embodiment 1 of the present invention.

Next, the transmission band setting will be described in detail. As shown in FIG. 5, one OFDM symbol is formed with subcarriers #1 to #16 (K=16). Further, the bandwidth of this OFDM symbol is 20 MHz, and, in the same way as described above, this 20 MHz band is equally divided into bands FB1 to FB4 per 5 MHz bandwidth in accordance with a bandwidth (5 MHz) in which the minimum capability mobile station can perform communication. Further, the minimum capability mobile station communicates user data using one of the bands FB1 to FB4.

Transmission band setting section 103 sets the BCH data transmission band to one of the bands FB1 to FB4. Transmission band setting section 103 changes the BCH data transmission band per frame. For example, transmission band setting section 103 sets the BCH data transmission band to FB1 in frame #1, sets the band to FB2 in frame #2, sets the band to FB3 in frame #3, and sets the band to FB4 in frame #4. Therefore, in the case of this example, IFFT section 106 maps BCH data on one of the subcarriers #1 to #4 included in FB1 in frame #1, maps BCH data on one of the subcarriers #5 to #8 included in FB2 in frame #2, maps BCH data on one of the subcarriers #9 to #12 included in FB3 in frame #3, and maps BCH data on one of subcarriers #13 to #16 included in FB4 in frame #4. In this case, IFFT section 106 may map BCH data on one of the subcarriers out of four subcarriers included in each of bands FB1 to FB4 or map BCH data on a plurality of subcarriers. In this way, transmission band setting section 103 changes over time, the band in which the BCH data transmission band is set out of the four bands FB1 to FB4 in 20 MHz band.

Figure 6:
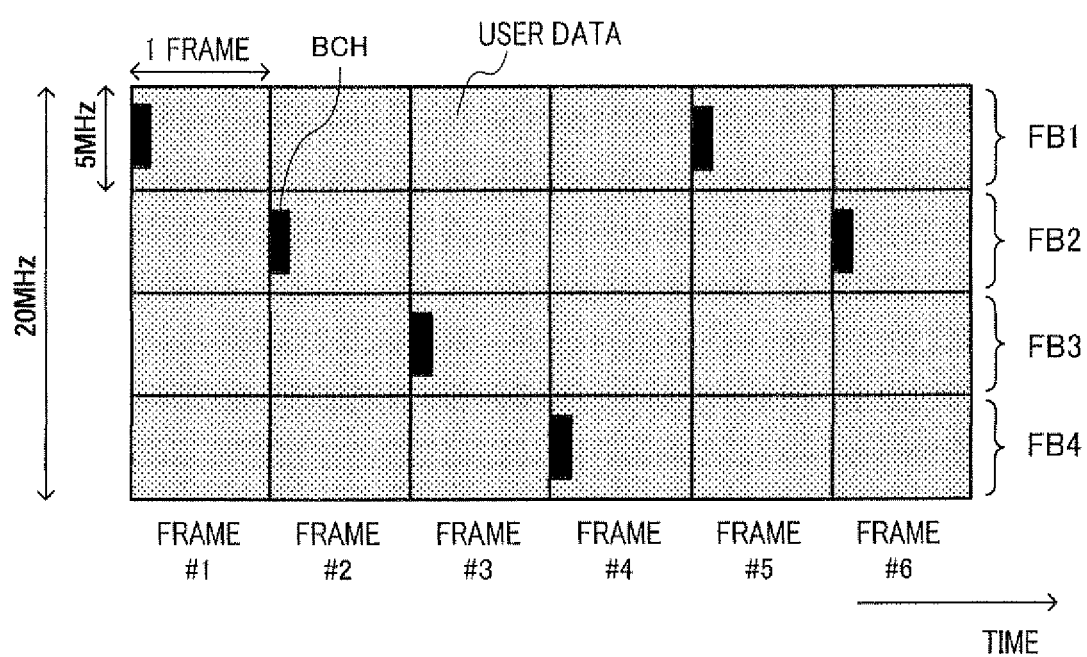
FIG. 6 shows a method for transmitting BCH data according to Embodiment 1 of the present invention.

This is shown in FIG. 6. As shown in this figure, the BCH data transmission band is set to FB1 in frame #1, set to FB2 in frame #2, set to FB3 in frame #3, and set to FB4 in frame #4. In frame #5, the BCH data transmission band is set to FB1 again. In this way, transmission band setting section 103 changes over time, the band in which the BCH data transmission band is set periodically. Although the band in which the BCH data transmission band is set is changed to FB1, FB2, FB3 and FB4, in order, the order of change is not limited to this order. Further, although the transmission band is changed per frame here, the transmission band may be changed per each of a plurality of frames.

By setting the BCH data transmission band as described above, the minimum capability mobile station that communicates user data using, for example, FB1, can receive BCH data in frames #1 and #5 without switching the reception frequency while receiving user data. The same applies to the minimum capability mobile station that communicates user data using one of FB2 to FB4. That is, the minimum capability mobile station can always receive BCH data once every four frames without switching the reception frequency from that for receiving user data. In this way, according to the present embodiment, it is not necessary to switch the reception frequency to receive BCH data in the minimum capability mobile station that communicates user data using one of the bands FB1 to FB4, so that it is possible to prevent a decrease in user throughput and a decrease in system throughput, which are caused by the switching of the reception frequency.

Furthermore, the minimum capability mobile station does not need to switch the reception frequency to receive BCH data, so that it is possible to eliminate power consumption for processing of switching the reception frequency.

Figure 1:
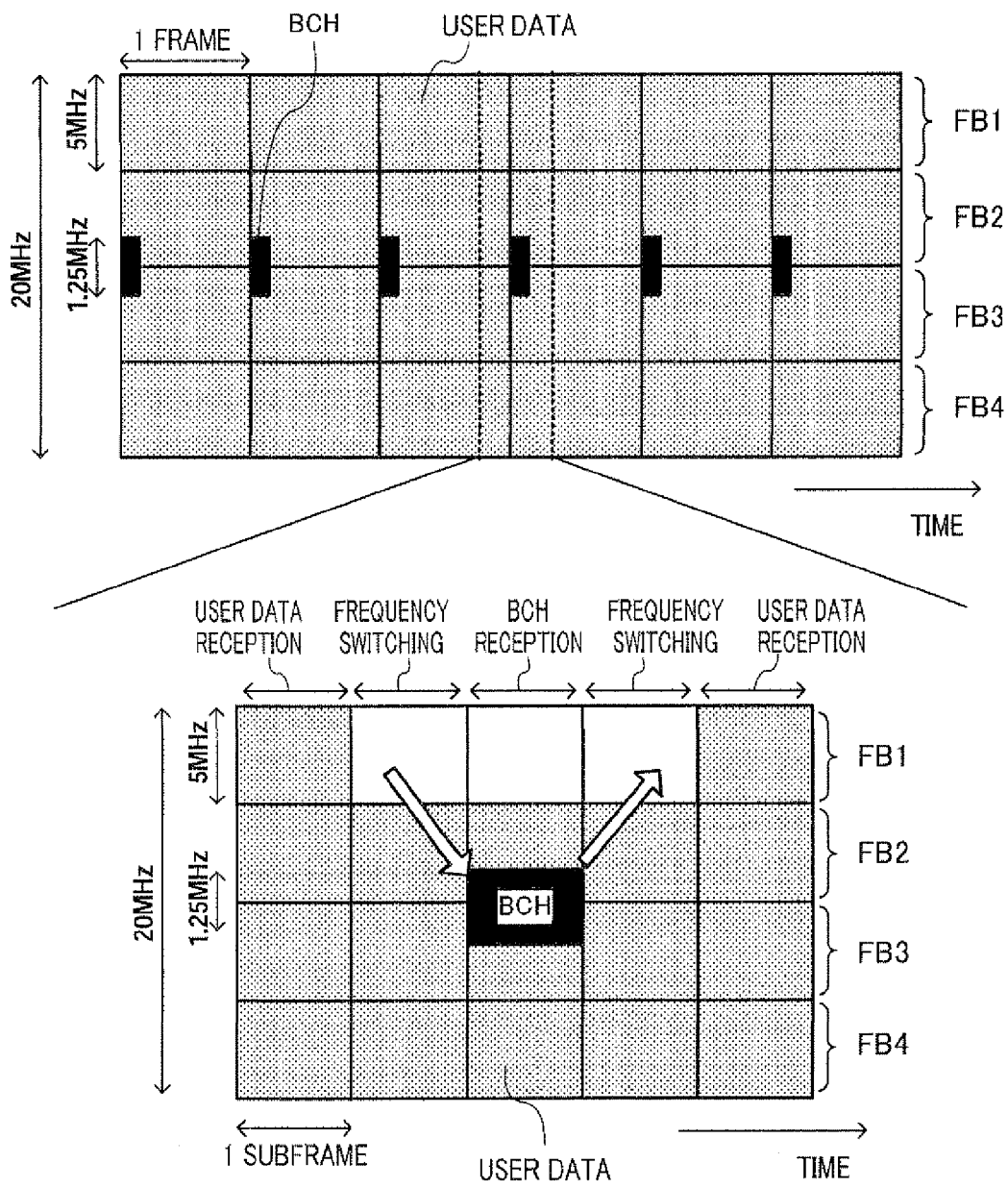
FIG. 1 shows a conventional method for transmitting BCH data.
Figure 2:
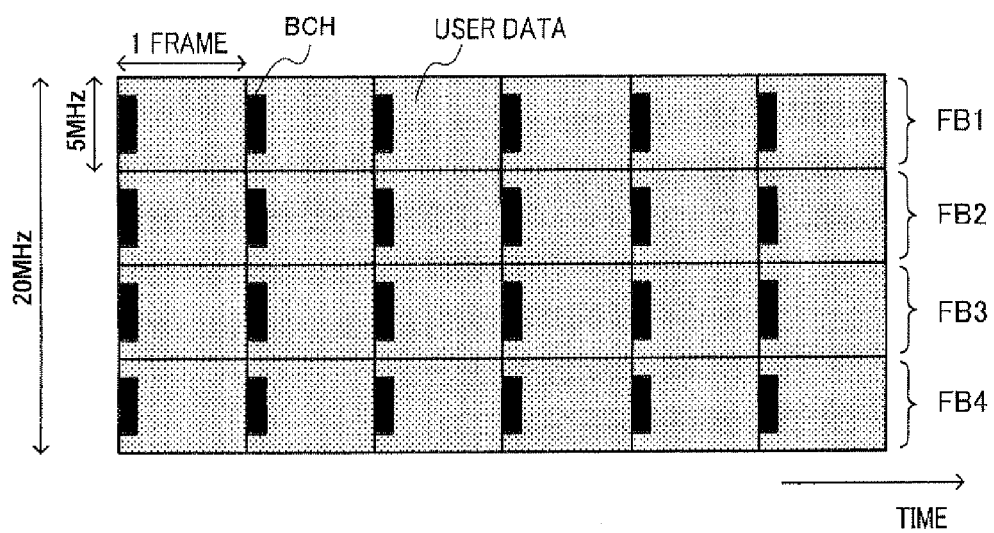
FIG. 2 shows example 1 for solving the problem of the conventional method for transmitting BCH data.
Figure 3:
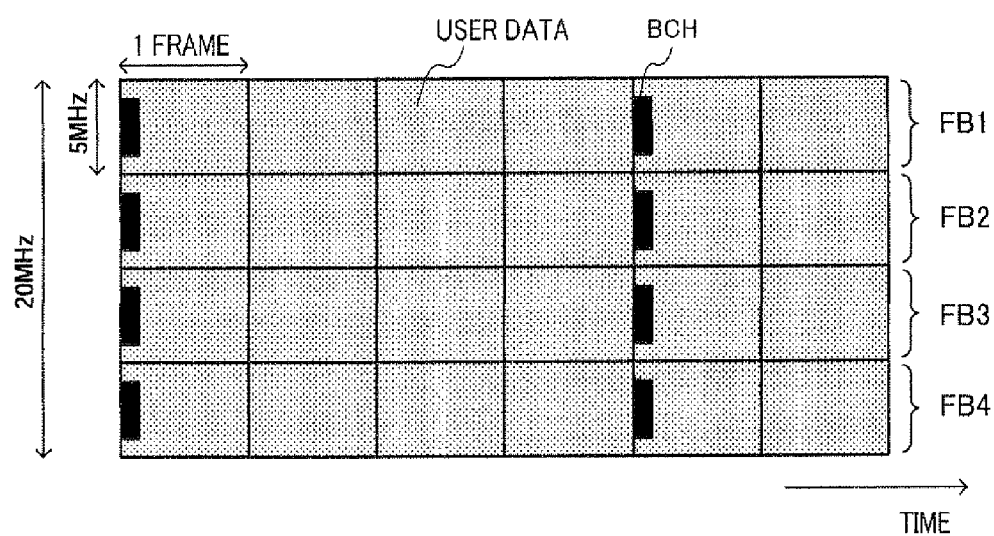
FIG. 3 shows example 2 for solving the problem of the conventional method for transmitting BCH data.

Further, as described above, the content of BCH data is updated in a relatively long cycle of approximately 100 frames, so that, as shown in FIG. 2, it is not necessary to transmit BCH data in every frame in all bands FB1 to FB4, and transmitting BCH data once every four frames in each band of FB1 to FB4 as described in the present embodiment, is enough. In this way, according to the present embodiment, compared to the case shown in FIG. 2, the number of times BCH data is transmitted in each band of FB1 to FB4 is reduced, so that it is possible to prevent a decrease in communication resources that can be used for user data.

Further, according to the present embodiment, BCH data is transmitted in one of the bands FB1 to FB4 in each frame and BCH data is not transmitted at the same timing in all bands FB1 to FB4, so that it is possible to prevent an increase in peak power of BCH data.

As described above, according to the present embodiment, it is possible to transmit BCH data efficiently.

Embodiment 2

The base station according to the present embodiment reports the transmission band for BCH data set by transmission band setting section 103 to mobile stations using a synchronization channel signal.

Figure 7:
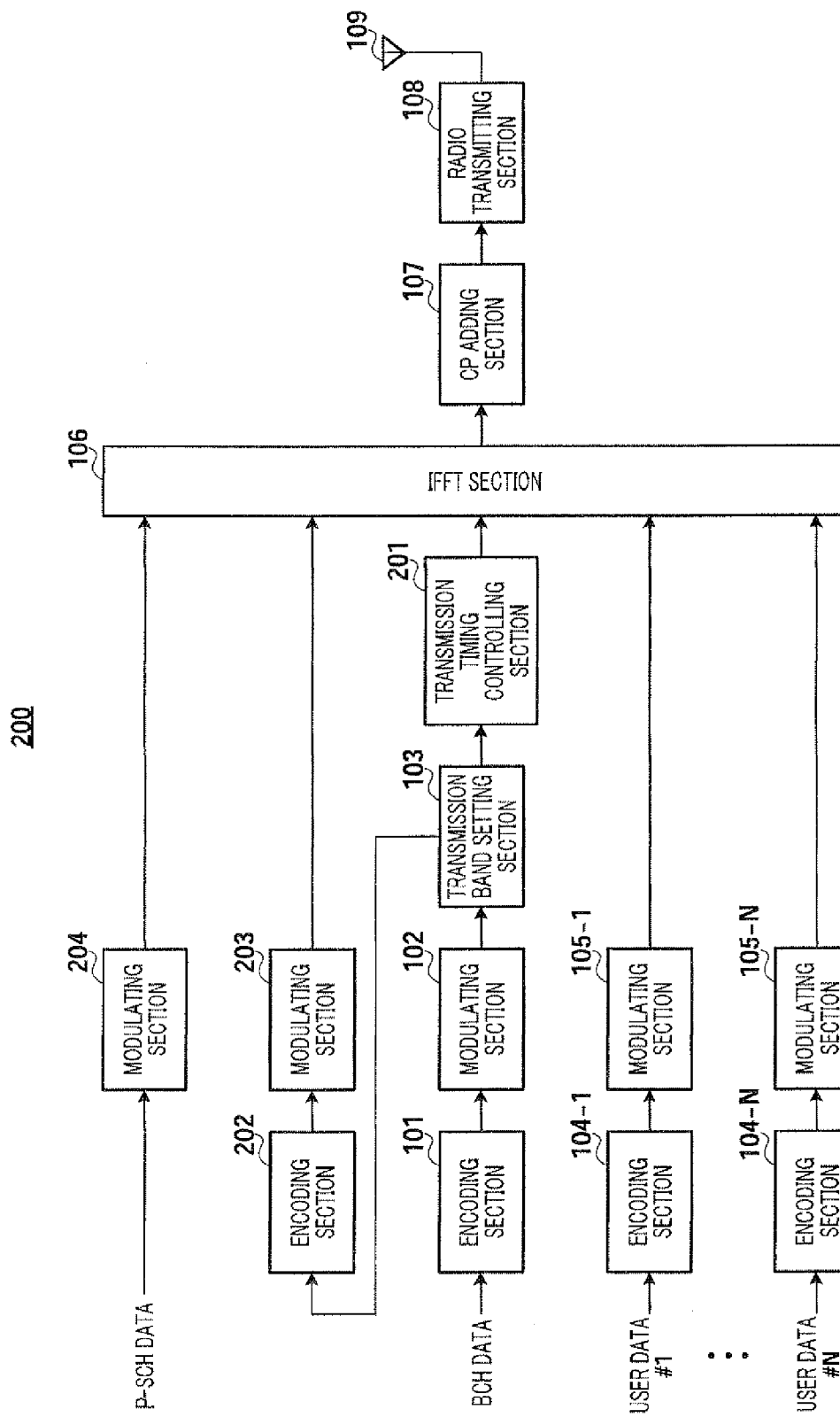
FIG. 7 is a block diagram showing the configuration of a base station according to Embodiment 2 of the present invention.

FIG. 7 shows the configuration of base station 200 according to the present embodiment. In FIG. 7, components that are the same as those in Embodiment 1 (FIG. 4) will be assigned the same reference numerals without further explanations.

Transmission timing controlling section 201 controls a timing for transmitting BCH data. This transmission timing control will be described in detail later.

Transmission band setting section 103 generates data for reporting the set the BCH data transmission band to mobile stations, that is, data for reporting which of bands FB1 to FB4 the transmission band is set to, to mobile stations (transmission band report data) and outputs the data as S-SCH (Secondary Synchronization CHannel) data. That is, the transmission band report data is transmitted using an S-SCH in an SCH (Synchronization CHannel). The S-SCH may also transmit scrambling code information and the like, in addition to the transmission band report data.

Encoding section 202 encodes S-SCH data.

Modulating section 203 modulates the encoded S-SCH data.

Further, data (P-SCH data) transmitted using a P-SCM (Primary Synchronization CHannel) in the SCH is modulated at modulating section 204. P-SCH data includes a sequence common to all cells, and this sequence is used for timing synchronization upon cell search.

IFFT section 106 maps SCH data formed with P-SCH data and S-SCH data, BCH data and user data #1 to #N on subcarriers #1 to #K, performs an IFFT and generates an OFDM symbol. In this case, IFFT section 106 maps the SCH data on a predetermined subcarrier out of subcarriers #1 to #16. Here, for example, IFFT section 106 maps the SCH data on either subcarrier #8 or #9, which is the center frequency band of the 20 MHz band.

Next, transmission timing control will be described in detail.

Figure 8:
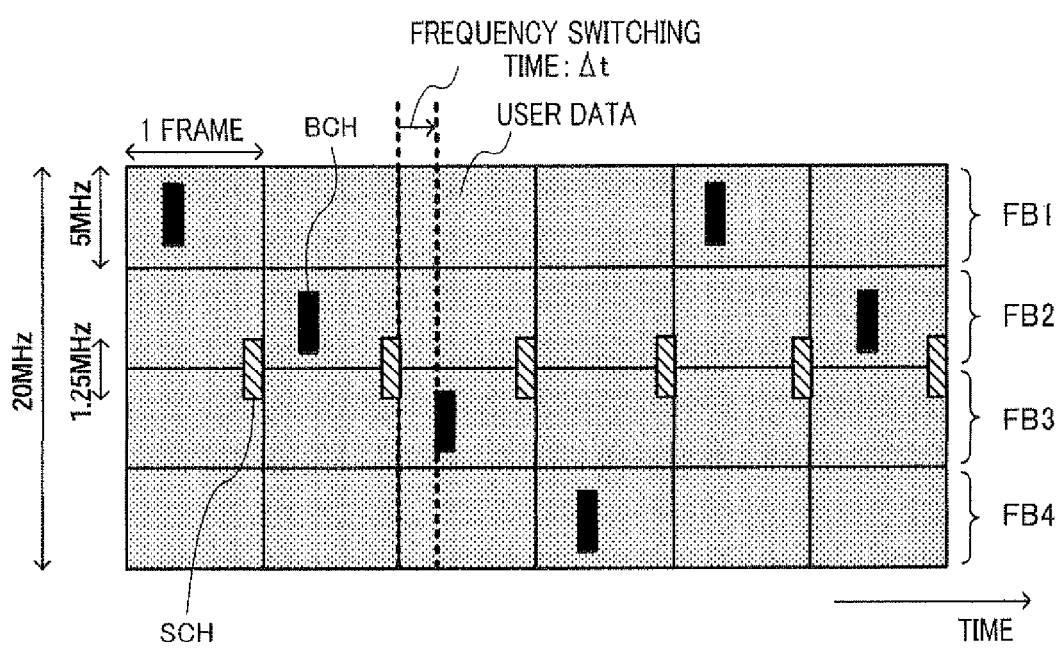
FIG. 8 shows a method for transmitting BCH data according to Embodiment 2 of the present invention.

As shown in FIG. 8, transmission timing controlling section 201 sets the timing for transmitting BCH data to timing Δt after the timing for transmitting SCH data. Δt is time a mobile station takes to switch the reception frequency (frequency switching time). Therefore, by this transmission timing control, radio transmitting section 108 transmits an OFDM symbol including BCH data at transmission timing Δt after a timing for transmitting an OFDM symbol including SCH data. This SCH data includes the transmission band report data for the BCH data transmitted Δt after this SCH data. The switching of the reception frequency at the mobile station normally requires time of approximately one subframe.

In this way, according to the present embodiment, transmission band report data is transmitted to mobile stations using an SCH, so that the minimum capability mobile station that is immediately after power activation and searching cell, detects the SCH and can receive BCH data Δt after the detection of the SCH by switching the reception frequency to the band shown in the transmission band report data after the detection of the SCH. Further, by setting Δt as time a mobile station takes to switch the reception frequency, the minimum capability mobile station can receive BCH data immediately after switching the reception frequency. Therefore, according to the present embodiment, even when BCH data is transmitted as described in Embodiment 1, the minimum capability mobile station immediately after power activation can receive BCH data upon power activation immediately after detecting the SCH, so that it is possible to shorten the time until user data communication is started.

Embodiment 3

Figure 9:
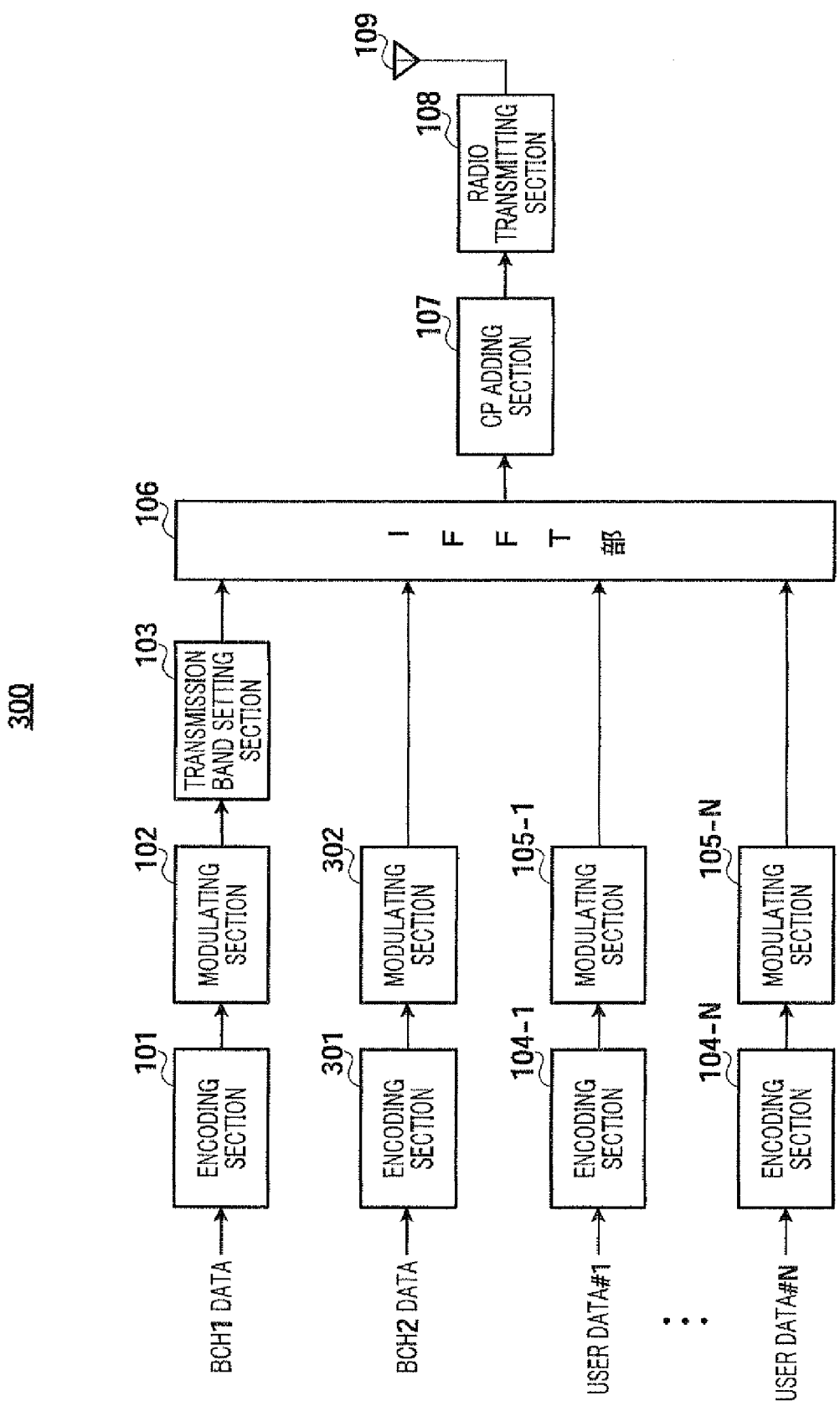
FIG. 9 is a block diagram showing the configuration of a base station according to Embodiment 3 of the present invention.

FIG. 9 shows the configuration of base station 300 according to the present embodiment. In FIG. 9, components that are the same as those in Embodiment 1 (FIG. 4) will be assigned the same reference numerals without further explanations.

The mobile stations to which base station 300 transmits BCH data are roughly divided into mobile stations that are communicating user data and mobile stations that are immediately after power activation and not communicating user data. A state where user data communication is in progress may be referred to as "connected mode" or "active mode," and a state where user data communication is not in progress may be referred to as "idle mode" or "inactive mode." Further, connected mode may be a state after the mobile station is assigned a band for communicating user data, and idle mode may be a state before the mobile station is assigned a band for communicating user data, such as standby mode.

In FIG. 9, BCH1 data is broadcast information required by mobile stations in connected mode, and, for example, includes subframe configuration information such as the arrangement of multicast subframes, and mapping information such as the arrangement of distributed channels and localized channels. The transmission band is set for BCH1 data in the same way as in Embodiment 1.

On the other hand, BCH2 data is information required by mobile stations in idle mode, and, for example, is mapping information for paging channels and RACH resource information.

Encoding section 301 encodes BCH2 data.

Modulating section 302 modulates the encoded BCH2 data.

IFFT section 106 maps the BCH1 data, the BCH2 data and user data #1 to #N on subcarriers #1 to #K, performs an IFFT and generates an OFDM symbol. In this case, IFFT section 106 maps the BCH2 data on a predetermined subcarrier out of subcarriers #1 to #16. Here, for example, IFFT section 106 maps the BCH2 data on either subcarrier #8 or #9, which is the center frequency band of 20 MHz band.

Figure 10:
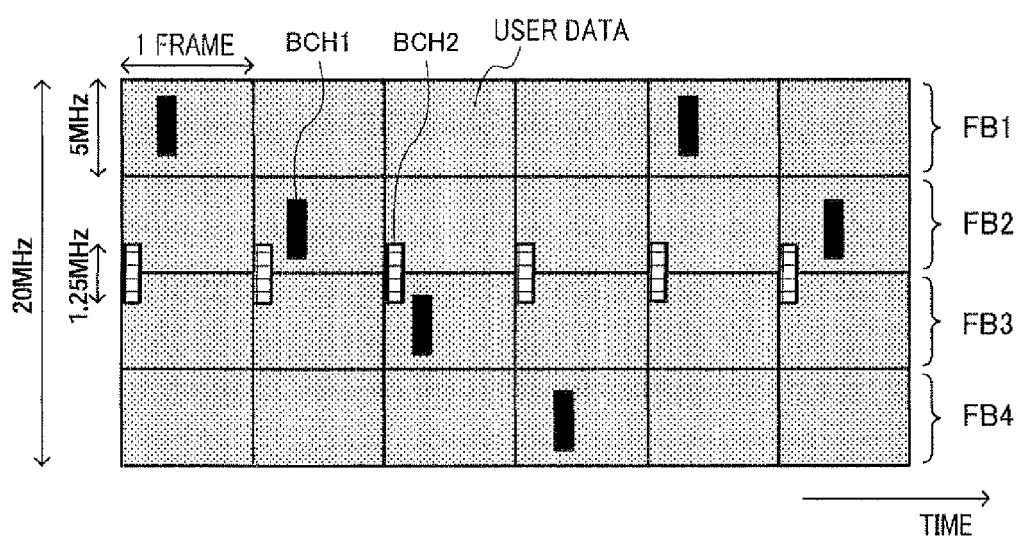
FIG. 10 shows a method for transmitting BCH data according to Embodiment 3 of the present invention.

That is, as shown in FIG. 10, base station 300 transmits BCH1 data including information required by mobile stations in connected mode in the same way as in Embodiment 1, and transmits BCH2 data including information required by mobile stations in idle mode, in every frame using predetermined band (in FIG. 10, the center frequency band of 20 MHz).

In this way, according to the present embodiment, while BCH1 data is transmitted in the same way as in Embodiment 1, BCH2 data is transmitted in every frame using predetermined band. Therefore, even when BCH1 data is transmitted as described in Embodiment 1, the mobile station in idle mode, immediately after power activation, can receive BCH2 data required upon power activation within one frame at a maximum, so that it is possible to shorten time until user data communication is started.

Embodiment 4

Figure 11:
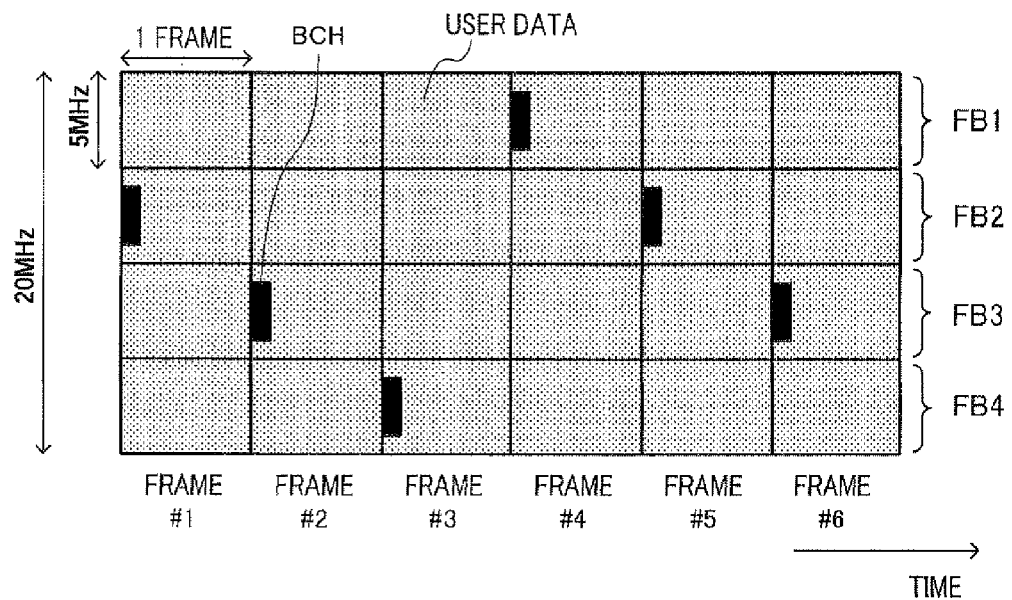
FIG. 11 shows a method for transmitting BCH data (in adjacent cell #2) according to Embodiment 4 of the present invention.

In the present embodiment, a plurality of base stations in adjacent cells transmit BCH data in the same way as in Embodiment 1 and make their transmission patterns different from each other. For example, while transmission band setting section 103 in base station 100 (FIG. 4) in cell #1 sets the BCH data transmission band as shown in FIG. 6, transmission band setting section 103 in base station 100 in cell #2, which is an adjacent cell of cell #1, sets the BCH data transmission band as shown in FIG. 11. Further, transmission band setting section 103 in base station 100 in cell #3, which is an adjacent cell of cell #1 and cell #2, sets the BCH data transmission band as shown in FIG. 12.

Figure 12:
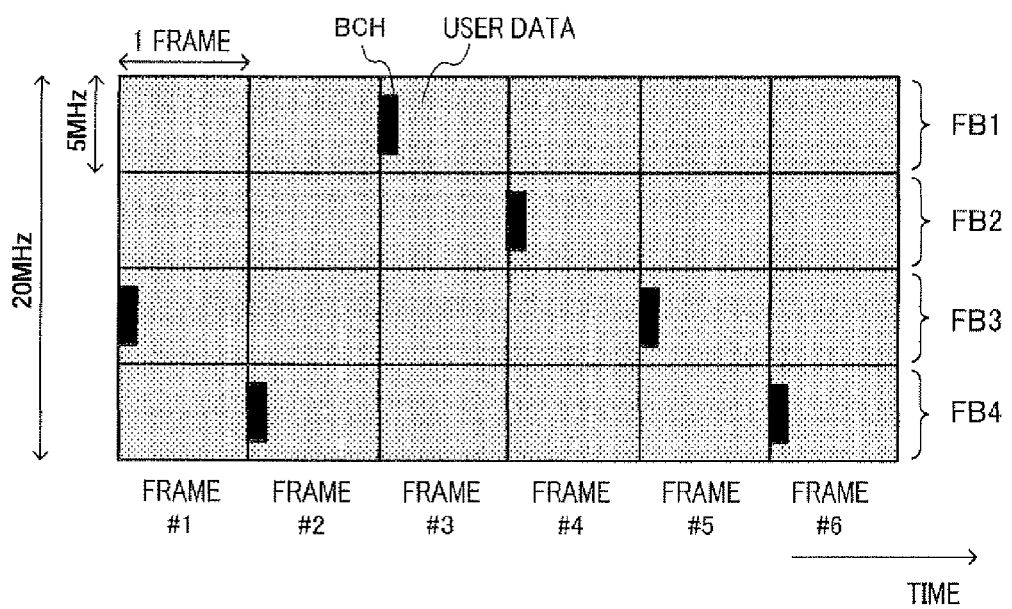
FIG. 12 shows a method for transmitting BCH data (in adjacent cell #3) according to Embodiment 4 of the present invention.

When FIG. 6, FIG. 11 and FIG. 12 are compared, in any of frames #1 to #6, the base stations transmit BCH data in bands different from other base stations in adjacent cells. For example, in frame 1, base station 100 in cell #1 transmits BCH data in band FB1, while base station 100 in cell #2 transmits BCH data in band FB2, and base station 100 in cell #3 transmits BCH data in band FB3.

In this way, according to the present embodiment, transmission band setting section 103 in base station 100 sets the BCH data transmission band to a band different from the bands to which other base stations 100 in the adjacent cells set the BCH data transmission bands. Therefore, according to the present embodiment, it is possible to reduce the interference between the cells of the BCH data transmitted with large power.

Embodiment 5

In UMTS, scheduling information for broadcast information (SIB1-18) is transmitted using an MIB (Master Information Block), SB1 (Scheduling Block 1) and SB2 (Scheduling Block 2). The MIB includes scheduling information for SIB1-18, SB1 and SB2, and SB1 and SB2 include scheduling information for SIB1-18.

A timing for transmitting the MIB is uniquely determined in UMTS. By acquiring an MIB at the determined timing first, the mobile station can learn scheduling information for the SIB, SB1 and SB2. By this means, the mobile station can learn which information can be acquired at which timing, for the first time. However, when SB1 or SB2 is included, the mobile station does not know the scheduling information included in SB1 or SB2 at this time, and so, by receiving SB1 or SB2, the mobile station can acquire all the scheduling information. SB1 and SB2 are optional functions, and scheduling of all SIBs may be reported using the MIB.

Here, transmitting scheduling information in the LTE will be described. Also in the LTE, in the same way as in UMTS, the mobile station can learn scheduling from information such as the MIB, that is, information stored in the mobile station, but requires broadcast information that can be received. This information may be transmitted using fixed resources in the center frequency band (of a 1.25 MHz bandwidth), and by acquiring resources, the mobile station can obtain scheduling information for the broadcast information.

As described above, by acquiring the fixed resources in the center frequency band, the mobile station can obtain the scheduling information. However, the mobile station not capable of performing reception at 15 MHz or 20 MHz, may not be able to acquire the fixed resources in the center frequency band after having shifted to RRC_CONNECTED state. That is, the mobile station performs reception in the center frequency band in RRC_IDLE state and can receive scheduling information for broadcast information. After this, when the mobile station shifts to RRC_CONNECTED state, the mobile station cannot receive scheduling information for broadcast information. By this means, there are the following two problems.

One problem is that required broadcast information also exists during RRC_CONNECTED state and this information needs to be received every time the information is updated. Whether the information is updated is reported using a value tag included in the MIB (or SB1 and SB2), and the mobile station can learn whether the information is updated by receiving the MIB. Therefore, mobile stations in RRC_CONNECTED state, which cannot acquire the MIB, can learn whether the information is changed, after actually receiving data.

The other problem is that, although scheduling for broadcast information may not change so frequently, scheduling may change when the size of the information changes. In this case, the mobile station cannot obtain scheduling information for new broadcast information without acquiring the MIB again.

In Embodiment 3, the arrangement of BCH1 in the frequency domain, which is required by mobile stations in the connected mode, changes over time, and BCH2, which is required by mobile stations in idle mode, is fixed in the center frequency band. Here, with regard to the detail of transmission of broadcast information to mobile stations in connected mode, various information is transmitted to the mobile stations. To be more specific, in UMTS, the broadcast information is classified into the MIB, SB and SIB (the SIB includes various types such as SIB1, 2, 3, . . . , and 18).

Further, as specified in detail in the "3GPP TS 25.331: Radio Resource Control; Protocol Specification," mobile stations in connected mode require a lot of information components.

Figure 13:
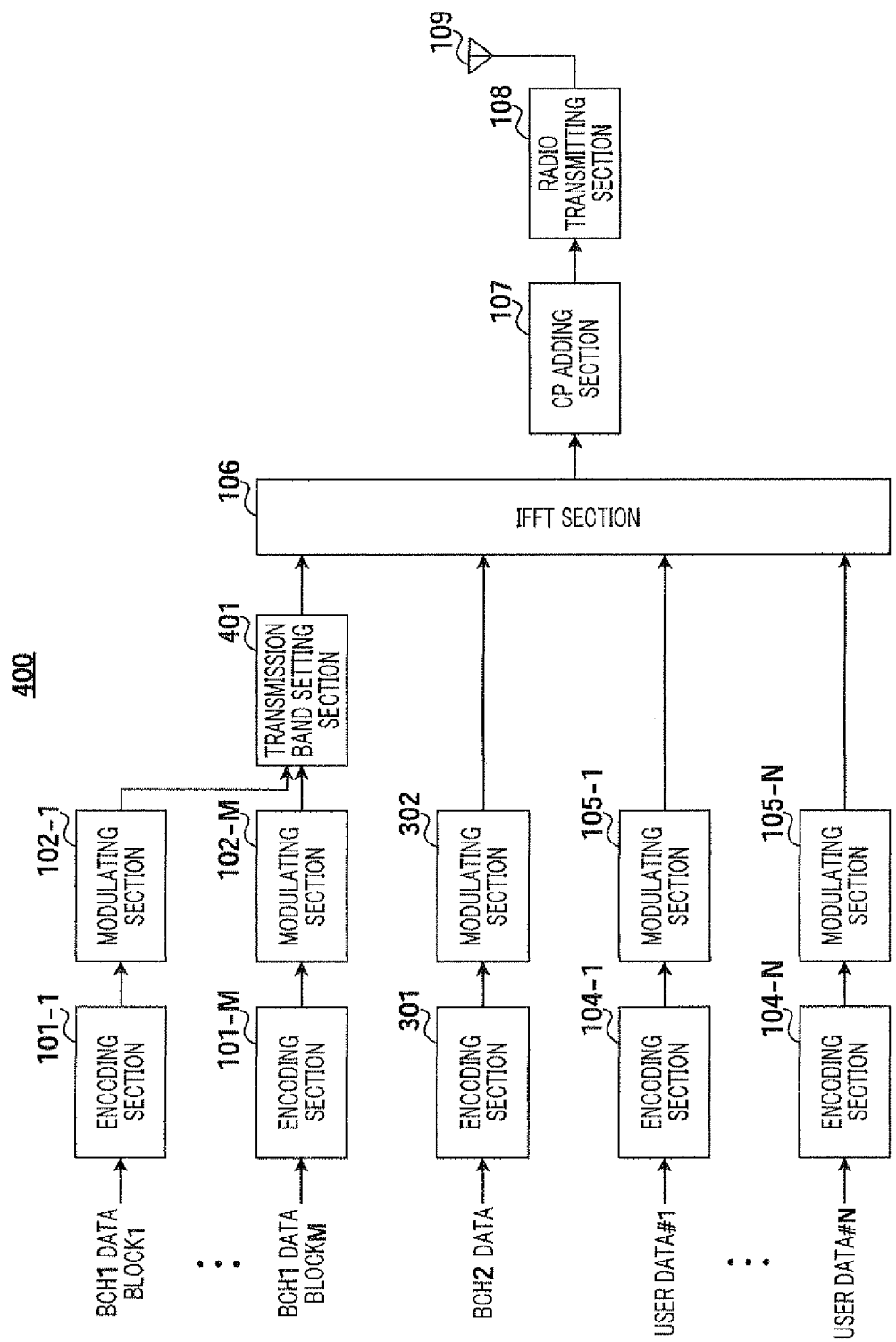
FIG. 13 is a block diagram showing the configuration of a base station according to Embodiment 5 of the present invention.

FIG. 13 shows the configuration of base station 400 according to the present embodiment. In FIG. 13, components that are the same as those in Embodiment 1 (FIG. 4) will be assigned the same reference numerals without further explanations.

As shown in FIG. 13, base station 400 has encoding sections 101-1 to 101-M and modulating sections 102-1 to 102-M for blocks 1 to M of BCH1 data. Here, blocks 1 to M are defined per unit of resources required as input of data. BCH1 data is encoded and modulated per required resources. The modulated BCH1 data is outputted to transmission band setting section 401. Further, encoding and modulation may be the same or different between resources.

Transmission band setting section 401 sets frequency band for actually transmitting the BCH1 data outputted from modulating sections 102-1 to 102-M, and outputs the BCH1 data for which the frequency band is set, to IFFT section 106.

Therefore, to transmit these information to mobile stations in connected mode, a lot of radio resources may be used. When the operation of switching per time the frequency band to which the BCH1 resources described in Embodiment 3 are allocated (hereinafter "hopping"), is combined, the BCH transmission method shown in FIG. 14 is possible.

Figure 14:
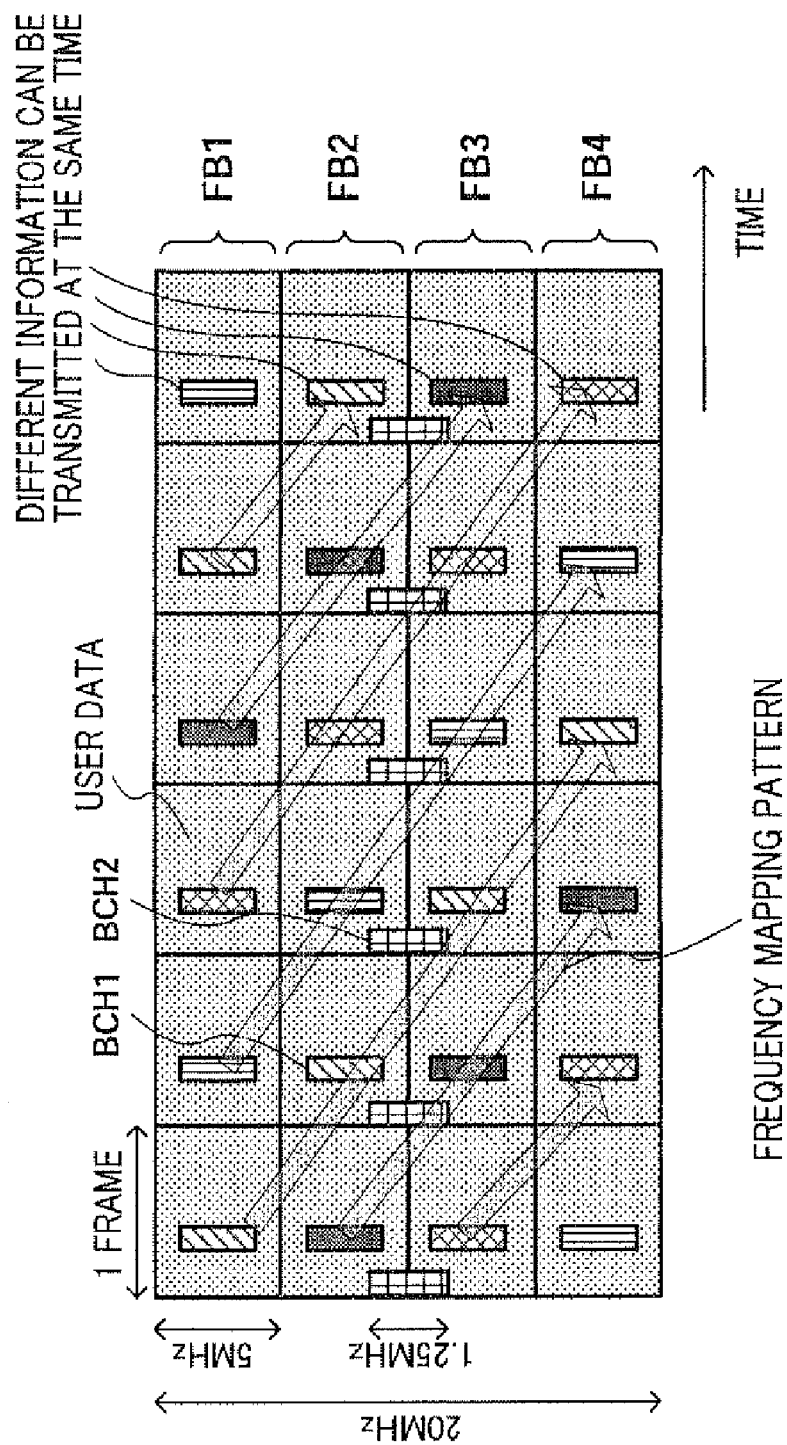
FIG. 14 shows a method for transmitting BCH data according to Embodiment 5 of the present invention.

In FIG. 14, four types of blocks of broadcast information are defined, and the blocks of the broadcast information are transmitted per (5 MHz) bandwidth in which the minimum capability mobile station can perform communication. For example, when blocks of broadcast information are a, b, c and d, in the first frame, a is transmitted in the first 5 MHz band, b is transmitted in the second 5 MHz band from the top, c is transmitted in the third 5 MHz band from the top and d is transmitted in the fourth 5 MHz band from the top. In the next frame, the blocks are shifted and transmitted. For example, b is transmitted in the first 5 MHz band and c is transmitted in the second 5 MHz band from the top. In this example, as described above, four blocks a, b, c and d are defined and each have resources. Therefore, in the example of FIG. 13, M=4, and, for example, a=BCH1 data block 1 and b BCH1 data block 2.

In this way, according to the present embodiment, the minimum capability mobile station can receive the broadcast information by performing reception at the (5 MHz) bandwidth in which the minimum capability mobile station performs communication, and the mobile station with high capability can receive a plurality of broadcast information at the same time, so that it is possible to reduce delay for receiving the broadcast information or reduce power consumption.

Figure 15:
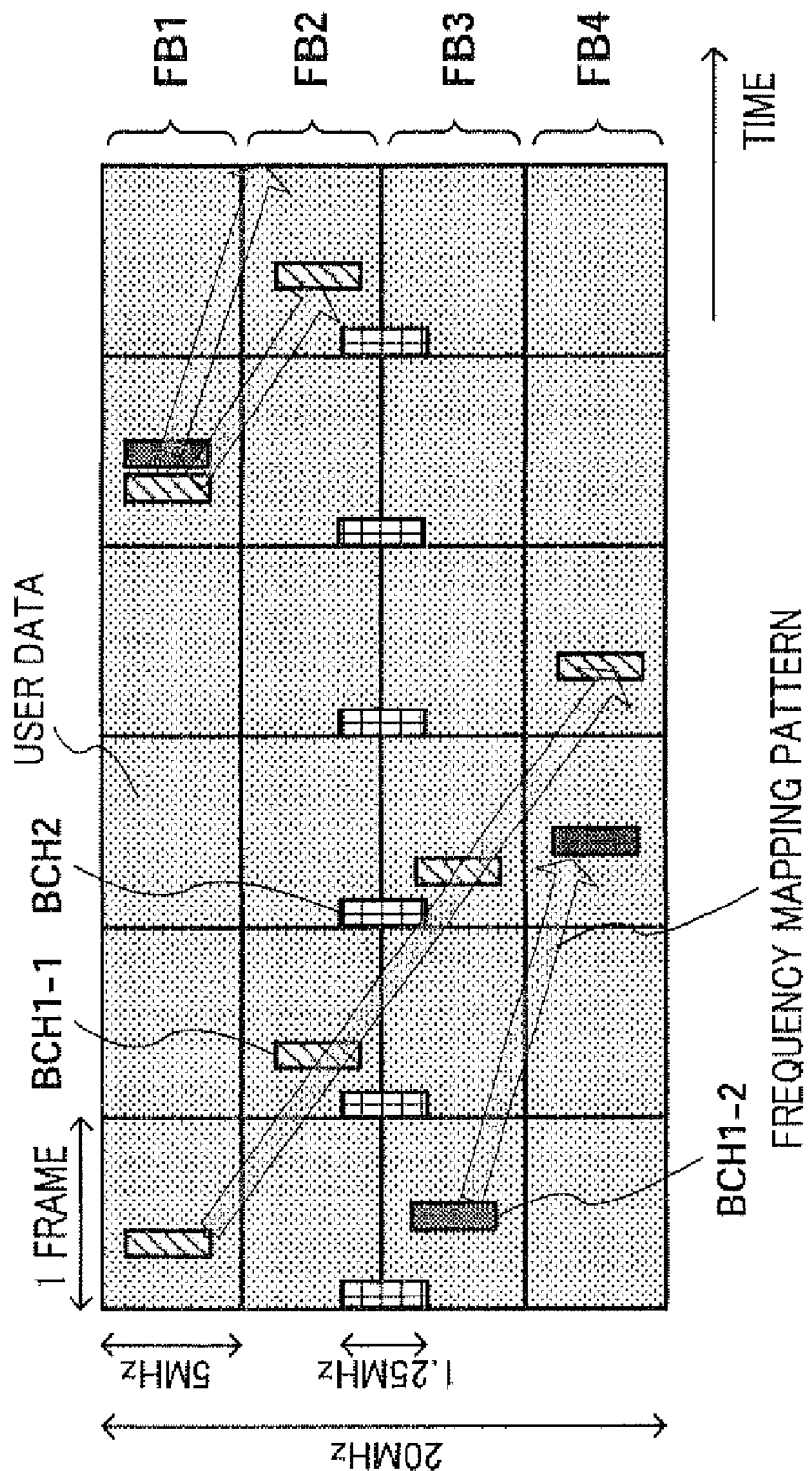
FIG. 15 shows another method for transmitting BCH data according to Embodiment 5 of the present invention.

Although an example has been described with the present embodiment where, when BCH1 resources are hopped in the frequency domain per time, radio resources for different BCH1 perform the same hopping operation, it is also possible to perform the hopping operation shown in FIG. 15. To be more specific, when there are BCH1-1 and BC1-11-2, BCH1-1 may be hopped every frame, and BCH1-2 may be hopped every two frames.

Figure 16:
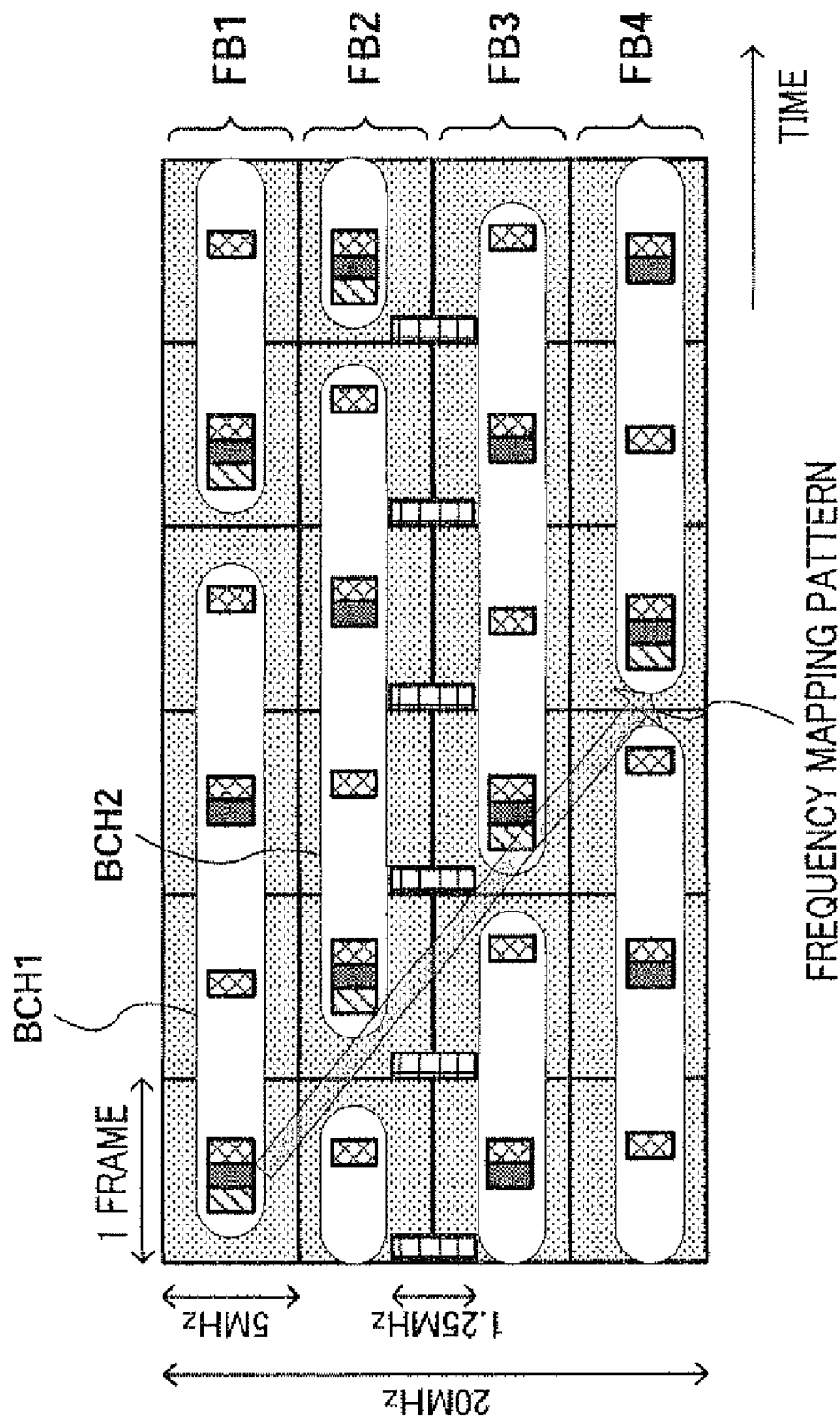
FIG. 16 shows still another method for transmitting BCH data according to Embodiment 5 of the present invention.

Further, BCH1 may be defined as the combination of a plurality of radio resources. That is, as shown in FIG. 16, BCH1 actually has three resources in the first frame, the first resource in the three resources is used only once per each of four frames, the second resource is ensured every two frames, and the last resource is ensured every frame. In this case, the aggregate of these is defined as BCH1 and may be hopped in the frequency domain. In the case of FIG. 16, M=1 and there is only one resource unit. However, there may be a plurality of such combinations of radio resources, and, in that case, M becomes plural.

Figure 17:
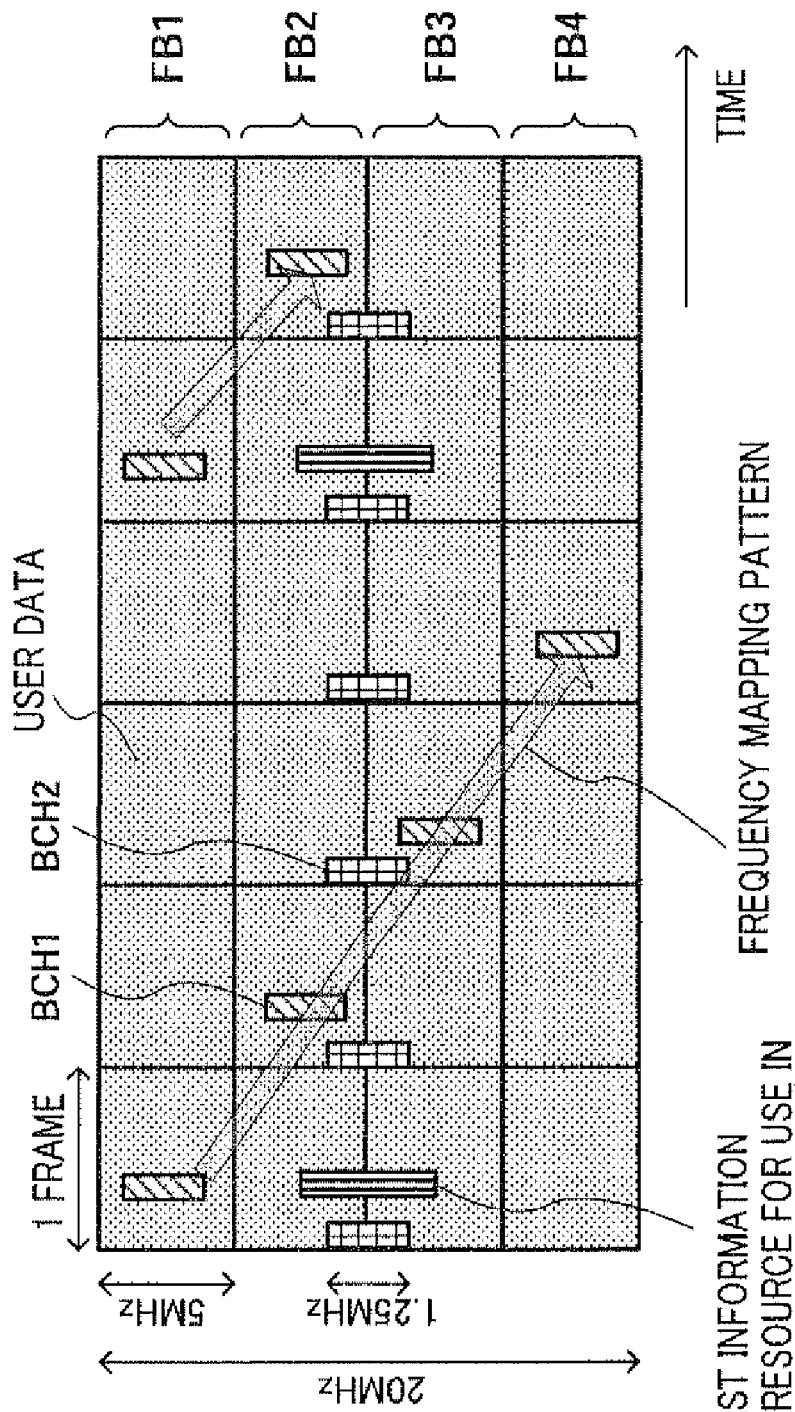
FIG. 17 shows yet another method for transmitting BCH data according to Embodiment 5 of the present invention.

Further, although a case has been described with the present embodiment where broadcast information for use in idle mode is all transmitted in 1.25 MHz of the center frequency band, it is also possible to perform transmission using other resources. To be more specific, as shown in FIG. 17, resource blocks for transmitting the broadcast information for use in idle mode is prepared other than 1.25 MHz of the center frequency band. All mobile stations in idle mode need to be able to receive this information, and so the frequency band to be used is limited to the bandwidth (here, 5 MHz) in which the minimum capability mobile station in the center frequency band can perform communication.

Embodiment 6

Although how radio resources are allocated for a lot of information that have to be transmitted to mobile stations in connected mode, has been described with Embodiment 5, information relating to scheduling of information allocated to radio resources will be described in Embodiment 6 of the present invention. Here, an MIB and SIB1-3 are assumed to be broadcast information for mobile stations in idle mode, and an SB and SIB4-8 are assumed to be broadcast information for mobile stations in connected mode.

As described above, in UMTS, scheduling information for broadcast information (SIB) is transmitted using the MIB or SB1 and SB2. However, when this scheduling information is transmitted in the center frequency band, a problem arises that mobile stations in connected mode cannot receive new scheduling information. To solve this problem, scheduling information for the broadcast information transmitted in the center frequency band and scheduling information for the SB transmitted in bands other than the center frequency band, are transmitted using the MIB.

Figure 18:
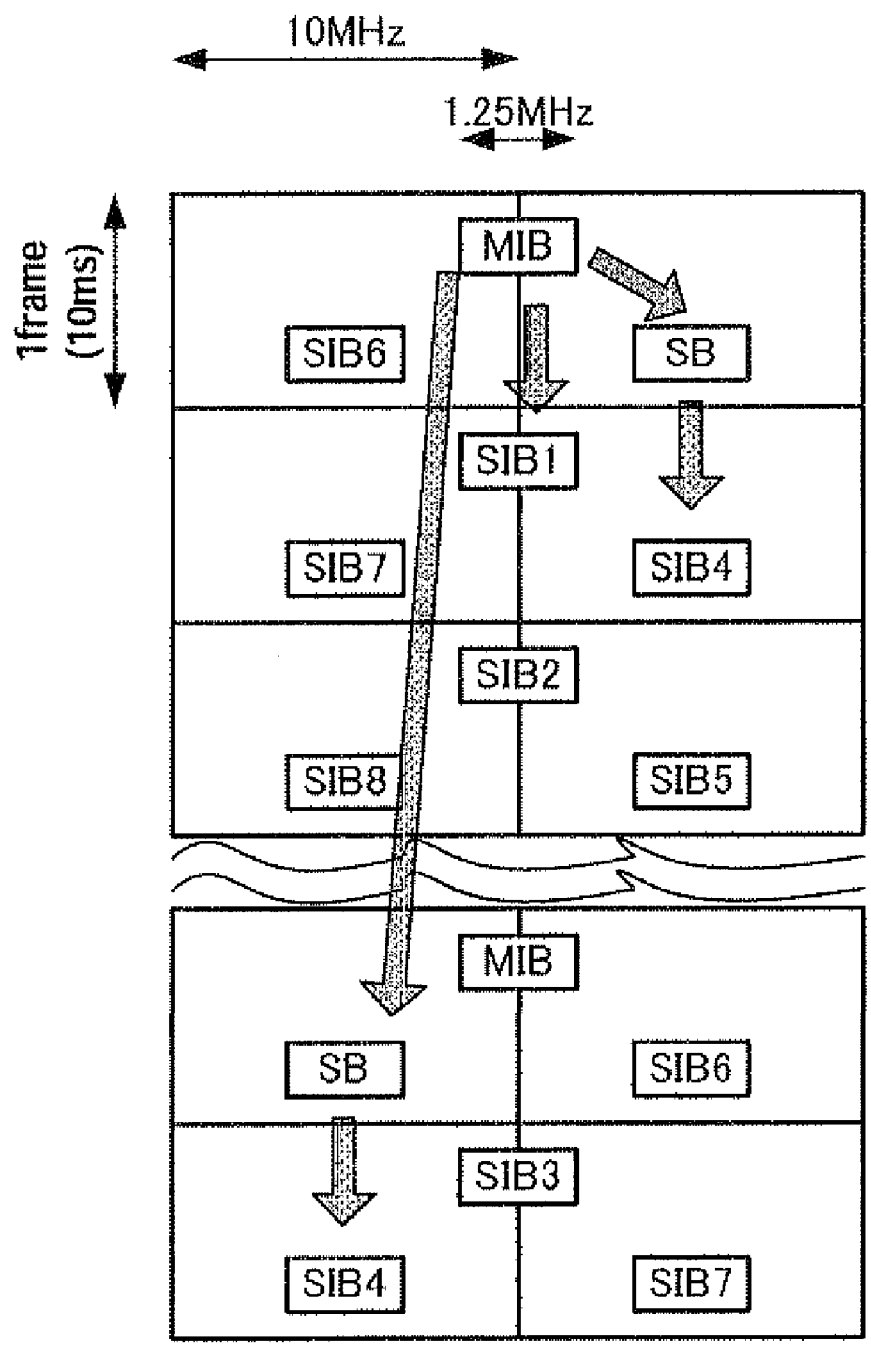
FIG. 18 shows a method for transmitting scheduling information according to Embodiment 6 of the present invention.

Here, the SB is transmitted per (5 MHz) bandwidth in which the minimum capability mobile station can perform communication so that the minimum capability mobile station can receive the SB. Scheduling information for broadcast information mobile stations in RRC_CONNECTED state require is reported using the SB. FIG. 18 is its conceptual diagram.

Here, a case is shown for ease of explanation, where the bandwidth in which the minimum capability mobile station can perform communication is 10 MHz instead of 5 MHz and SIB1-3 exists as broadcast information for use in idle mode, and SIB4-8 exists as broadcast information for use in connected mode. Here, the MIB includes broadcast information SIB1-3 for mobile stations in idle mode and scheduling information for the SB. On the other hand, the SB includes scheduling information for broadcast information SIB4-8 for use in connected mode. Therefore, a mobile station in idle mode can obtain scheduling information for SB including scheduling information for broadcast information to be received when the mobile station shifts to connected mode, in addition to scheduling information for SIB1-3 the mobile station requires. Further, a mobile station in connected mode receives the SB based on scheduling information for the SB received in idle mode. The mobile station obtains scheduling information for SIB4-8, which is broadcast information for use in connected mode, thereby receiving SIB4-8.

Figure 19:
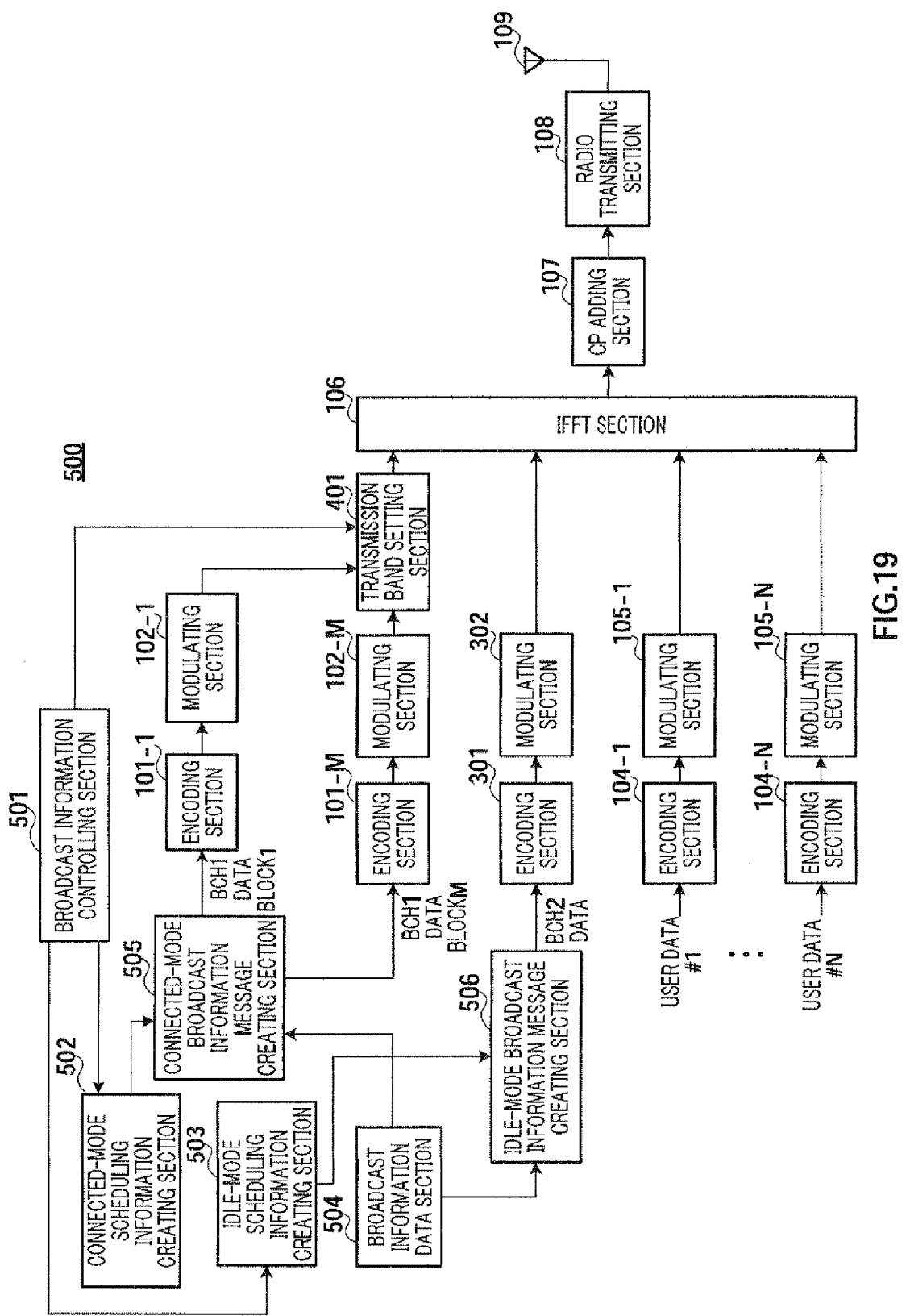
FIG. 19 is a block diagram showing the configuration of a base station according to Embodiment 6 of the present invention.

FIG. 19 shows the configuration of base station 500 according to the present embodiment. In FIG. 19, components that are the same as those in Embodiment 5 (FIG. 13) will be assigned the same reference numerals without further explanations.

In FIG. 19, broadcast information controlling section 501 controls, for example, how often broadcast information is transmitted, transmission timing of the broadcast information and resource information (resource amount) required for transmitting the broadcast information. Information for mobile stations in connected mode is outputted to connected-mode scheduling information creating section 502 as control information, and information for mobile stations in idle mode is outputted to idle-mode scheduling information creating section 503. Further, broadcast information controlling section 501 also controls transmission band setting section 401 and controls transmission band for broadcast information.

Connected-mode scheduling information creating section 502 creates scheduling information for broadcast information to be transmitted to mobile stations in connected mode. This scheduling information corresponds to content of the above-described SB. This result is outputted to connected-mode broadcast information message creating section 505.

Idle-mode scheduling information creating section 503 creates scheduling information for broadcast information to be transmitted to mobile stations in idle mode. This information is included in content of the above-described MIB. This result is transmitted to idle-mode broadcast information message creating section 506.

Broadcast information data section 504 processes broadcast information, data and outputs broadcast information for mobile stations in connected mode to connected-mode broadcast information message creating section 505 and outputs broadcast information for mobile stations in idle mode to idle-mode broadcast information message creating section 506.

Connected-mode broadcast information message creating section 505 creates broadcast information messages for mobile stations in connected mode per frequency band and outputs the messages to encoding sections 101-1 to 101-M as BCH1 data.

Idle-mode broadcast information message creating section 506 creates broadcast information messages for mobile stations in idle mode and outputs the messages to encoding section 301 as BCH2 data.

Next, the operation of the base station shown in FIG. 19 will be described.

Broadcast information controlling section 501 determines information for controlling the broadcast information. Here, the information for controlling the broadcast information includes types of broadcast information, size for each type of broadcast information, transmission timing for each type of broadcast information. Broadcast information controlling section 501 picks up broadcast information that should be transmitted using this cell, for mobile stations in connected mode, from the type of broadcast information, and outputs their sizes, transmission timings and the like to connected-mode scheduling information creating section 502 per type of broadcast information. In the same way, broadcast information controlling section 501 picks up broadcast information that should be transmitted using this cell, for mobile stations in idle mode, from the type of broadcast information, and outputs their sizes, transmission timings and the like to idle-mode scheduling information creating section 503 per type of broadcast information.

Connected-mode scheduling information creating section 502 and idle-mode scheduling information creating section 503 create scheduling information based on the information outputted from broadcast information controlling section 501. Examples of scheduling information include transmission timing for each type of broadcast information, transmission cycle and radio resource information required for transmitting broadcast information. This result is outputted from connected-mode scheduling information creating section 502 to connected-mode broadcast information message creating section 505, and outputted from idle-mode scheduling information creating section 503 to idle—mode broadcast information message creating section 506. Here, scheduling information for use in idle mode is transmitted using the MIB, and there is one piece of scheduling information for use in idle mode. When both MIB and SB are used to transmit scheduling information for use in idle mode, there are a plurality of pieces of scheduling information for use in idle mode. Further, different scheduling information for use in connected mode may be transmitted per frequency band. In that case, it is necessary to change scheduling information depending on which frequency band is used to transmit scheduling information, and so it is necessary to create scheduling information taking into consideration to which frequency band scheduling information is transmitted.

Broadcast information data section 504 manages data included in broadcast information, outputs broadcast information for mobile stations in connected mode to connected-mode broadcast information message creating section 505, and outputs broadcast information for mobile stations in idle mode to idle-mode broadcast information message creating section 506. The content of this broadcast information may be set by the higher layer, set manually or set using other methods, but any method is possible.

Connected-mode broadcast information message creating section 505 creates broadcast information messages using broadcast information data for mobile stations in connected mode outputted from broadcast information data section 504, and the scheduling information outputted from connected-mode scheduling information creating section 502. In the example of FIG. 18, SB and SIB4-8 are generated. The generated broadcast information messages are outputted to a section to which the messages should be transmitted, among encoding sections 101-1 to 101-M. In the case of the first frame in the example of FIG. 18, SIB6 is transmitted to the higher 10 MHz and SB is transmitted to the lower 10 MHz. When SIB6 is transmitted using BCH data block 1 and SB is transmitted using BCH data block M, SIB6 is transmitted to encoding section 101-1 and SB is transmitted to encoding section 101-M. This operation is performed every timing broadcast information is transmitted.

Further, data outputted to encoding sections 101-1 to 101-M is not the same, and, in the example of FIG. 18, in the first frame, SB is outputted to encoding section 101-1 and SIB6 is outputted to encoding section 101-M. The encoded and modulated signal is outputted to transmission band setting section 401.

Transmission band setting section 401 is controlled by broadcast information controlling section 501. To be more specific, broadcast information controlling section 501 controls transmission band setting section 401 as to which broadcast information is transmitted using which frequency band.

Idle-mode broadcast information message creating section 506 creates broadcast information messages from broadcast information data for mobile stations in idle mode outputted from broadcast information data section 504 and the scheduling information outputted from idle-mode scheduling information creating section 503. In the example of FIG. 18, an MIB and SIB1-3 are generated.

In this way, according to the present embodiment, it is possible to hop in the frequency domain, the broadcast information to be transmitted to mobile stations in connected mode. As a result, compared to the case where the same broadcast information is transmitted per frequency band, the mobile station that can receive 20 MHz band, can suppress reception delay of broadcast information and receive broadcast information.

In UMTS, as scheduling information for broadcast information, information showing the position of the SIB (information corresponding to a frame number), how often information is transmitted (that is, information as to every how many frames information is transmitted) and information whether the SIB is arranged across frames (whether the SIB is divided into segmentations). In the LTE, it is also possible to use information similar to that in UMTS or supplementary information (such as subcarrier information) to be added to similar information, as scheduling information. Scheduling may be performed using other information.

There are several patterns in transmission of the above-described subcarrier information. The LTE manages a plurality of subcarriers as one radio resource. By assigning an index to this radio resource, it is possible to report in a simple manner which radio resource is used to perform transmission. However, there are a plurality of patterns in allocation of this radio resource, and, depending on the pattern to be used, different subcarriers may be actually allocated even for the same index. This pattern information needs to be transmitted in the center frequency band to perform scheduling of the SB. Therefore, the mobile station may use the pattern received in idle mode as is. Further, the mobile station may perform transmission again using the pattern for use in connected mode. By this means, mobile stations in connected mode can learn the allocation pattern of the radio resource without receiving the center frequency band. Further, the allocation pattern may be changed per TTI. In this case, mobile stations can learn the final allocation pattern based on L1 and L2 control signaling.

In the present embodiment, the SB is transmitted per frequency band supported by the minimum capability mobile station. The content of this SB can be changed between frequency bands or can be made exactly the same. When the content of this SB is made exactly the same, information showing the position of the SIB becomes the same between frequency bands, and so it is not possible to provide the advantage of the present invention. Therefore, as a reference for the position of the SB, the position of the SIB may be determined. That is, although scheduling is normally determined using SFN (System Frame Number), the position of the SIB is determined by shifting the position by the amount corresponding to the position of the SB. To describe this in detail using setting in UMTS, the scheduling information for SB specified using the MIB is assumed to be set such that information showing the position of the SB=the fourth frame and transmission is performed at a frequency of every 32 frames, and the scheduling information of the SB specified using the SB is assumed to be set such that information showing the position of SIB4=the sixth frame and transmission is performed at a frequency of every 64 frames. In this case, the SB is transmitted when "SFN value mod 32" is 4. SIB4 is normally transmitted when "SFN value mod 64" is 6. However, given an addition of 4 which shows the position of the SB, the SB is transmitted when "SFN value mod 64" is 10. In this case, as long as the position of the SB is shifted per frequency band, even if the content of the SB is the same, the same information is not transmitted at the same time.

Further, it is also possible to determine offset of each frequency band in advance. To be more specific, when there are four frequency bands, numbers 0 to 3 are assigned to the frequency bands. By multiplying offset values by frequency band numbers at the mobile station, it is possible to receive the scheduling information in the frequency band to which the mobile station connects. This offset information may be included in the MIB or included in the SB. Further, this offset information may be content that is fixed in the system. In this case, it is possible to perform the operation of making only the position of the SB the same between frequency bands.

Further, as shown in FIG. 18, SIBs may be arranged in the same order between higher and lower frequency bands or may be arranged in different order. Further, when the content is the same, a mobile station with high capability only has to receive the SB and show the difference between scheduling in different frequency bands to report the scheduling in different frequency bands. Further, when the order is different, it is necessary to include all the scheduling information for different frequency bands.

As described above, by making the content of the SB common between the frequency bands or specifying the scheduling information of other frequency bands, the mobile station receiving a specific frequency band can learn scheduling information for other frequency bands. By this means, when there is information required at the mobile station side, it is possible to provide the advantage of making it possible to receive information from other frequency bands by changing the frequency band. To be more specific, when data is not transmitted to the mobile station for a while and does not have to be transmitted, if the mobile station learns that there is required broadcast information and can obtain broadcast information faster by shifting to other frequency bands, the mobile station changes the frequency band.

Although with the present embodiment scheduling information for SB (the position information for SB included in MIB) is assumed to be stationary to some extent, it is also possible to support a case where the scheduling information is changed. To be more specific, it is possible to support mobile stations in idle mode only by updating the content of the MIB, and it is only necessary to report scheduling information for the SB to mobile stations in connected mode using a dedicated channel. Further, by transmitting the value tag of the MIB to mobile stations in connected mode in the same way as system information change indication used in UMTS, it is possible to command the mobile stations to acquire the MIB again.

Embodiment 7

Although a case has been mainly described with Embodiment 6 where broadcast information is transmitted in the same order per frequency band the minimum capability mobile station supports, a case will be described with Embodiment 7 of the present invention where further optimization is achieved based on the operation for the reception of information the mobile station requires.

Figure 20:
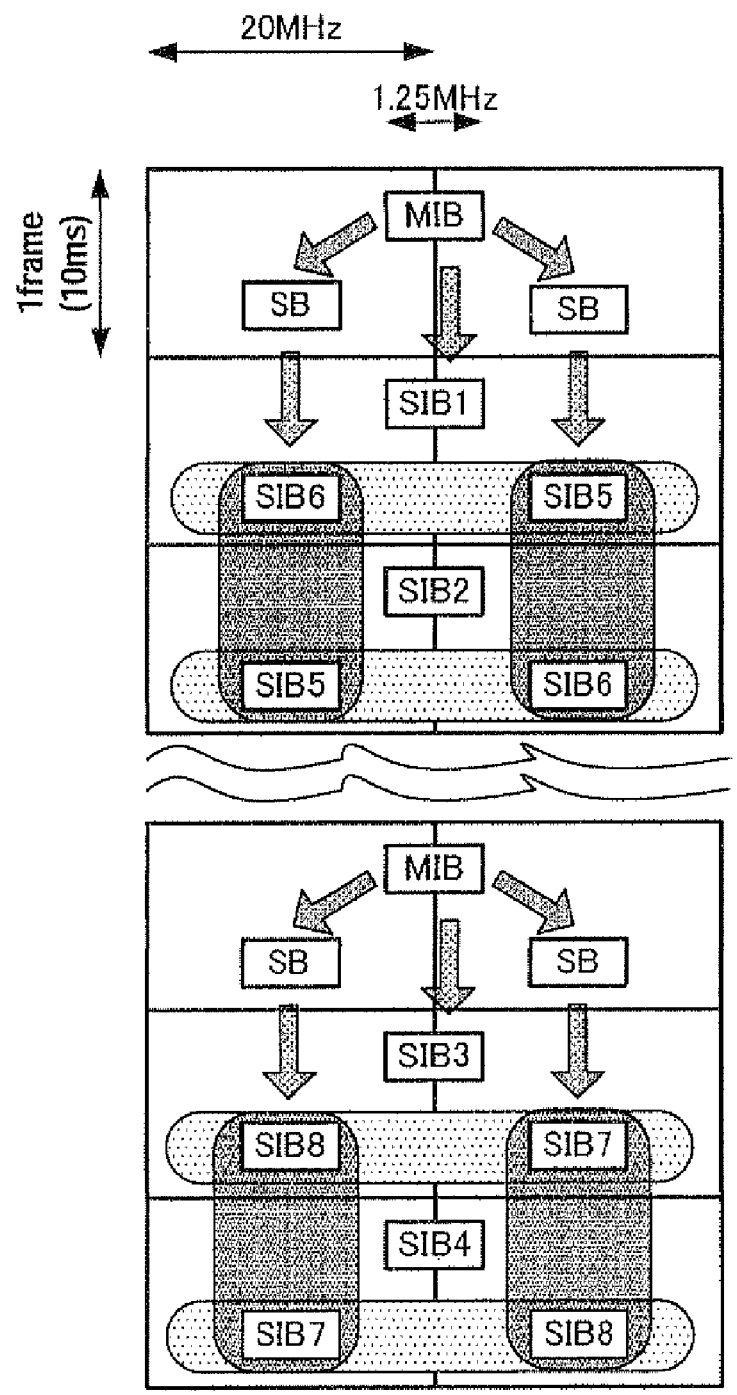
FIG. 20 shows a method for transmitting scheduling information according to Embodiment 7 of the present invention.

As described in Embodiment 5, there are a lot of SIBs. Here, when the mobile station performs RACH procedure, channel setting information for common channels and information such as the amount of uplink interference, are required, and these may be transmitted in different blocks. In this case, the mobile station can start RACH procedure only after receiving these two pieces of information. Therefore, it is necessary to receive these two pieces of information at the same time or at timings as close as possible. FIG. 20 is a conceptual diagram of transmission of the broadcast information that realizes this.

Here, SIB5 and SIB6 are assumed to be, for example, an information set required for the RACH procedure. At this time, SIB5 and SIB6 are transmitted in the higher frequency band and the lower frequency band, respectively, in second frame. The mobile station having capability of performing communication at 20 MHz can acquire all the information at this time. Next, in third frame, SIB6 and SIB5 are transmitted in the higher frequency band and the lower frequency band, respectively. At this time, it is possible to obtain information even if the mobile station capable of performing communication at 10 MHz connects to one of the frequency bands. By adopting this transmission method, required information can be obtained in one frame or in a plurality of consecutive frames, so that it is possible to reduce delay.

Figure 21:
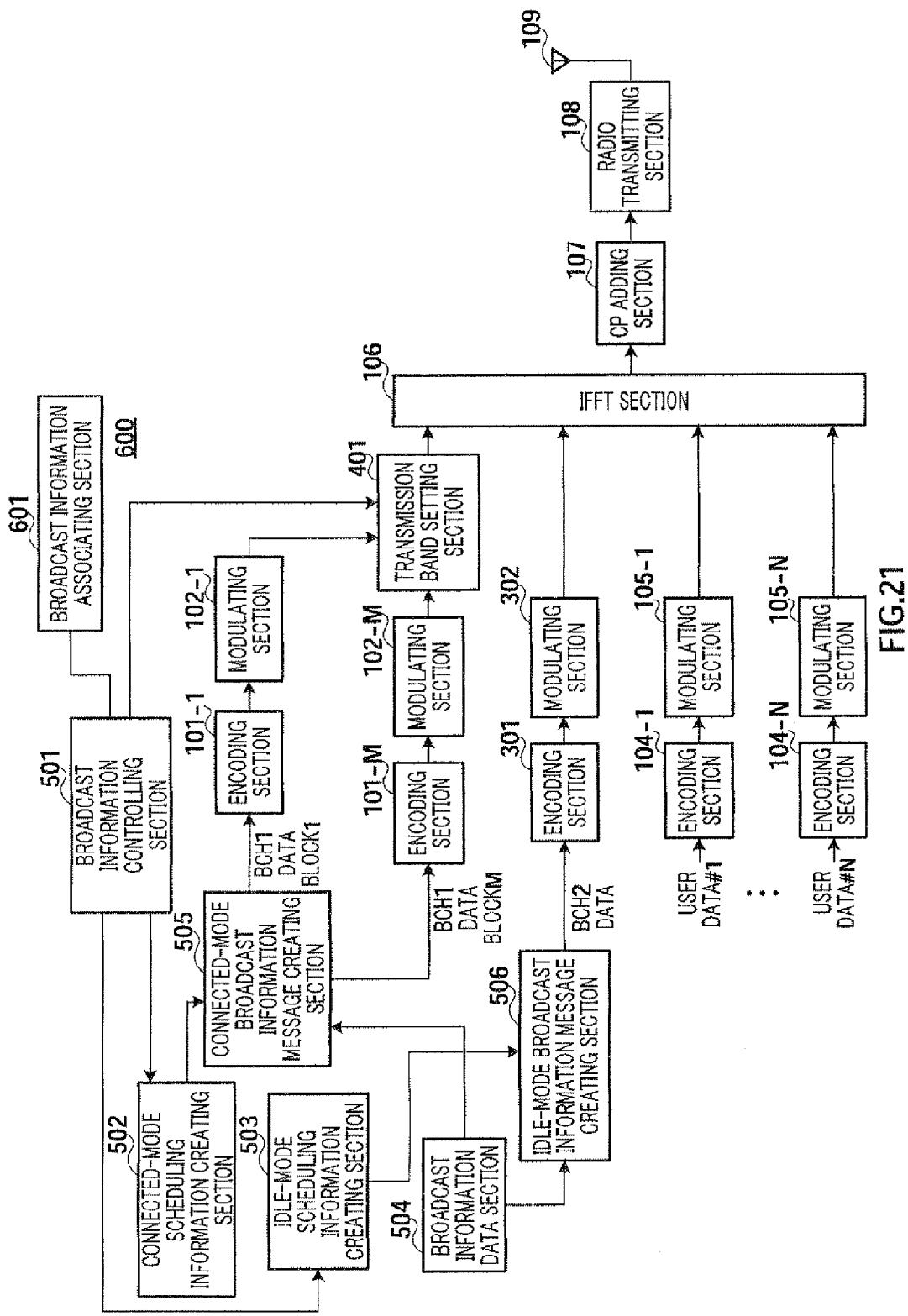
FIG. 21 is a block diagram showing the configuration of a base station according to Embodiment 7 of the present invention.

FIG. 21 shows the configuration of base station 600 according to the present embodiment. In FIG. 21, broadcast information associating section 601 manages related information of different types of broadcast information and outputs the information to broadcast information controlling section 501.

Next, the operation of the base station shown in FIG. 21 will be described.

Broadcast information associating section 601 manages the related information of different types of broadcast information as described above. Here, the related information includes the type of the broadcast information required for performing RACH procedure and the type of the broadcast information required for performing handover. In the example of FIG. 20, SIB5 and SIB6 are managed as a related pair, and SIB7 and SIB8 are managed as a related pair. This information is outputted from broadcast information associating section 601 to broadcast information controlling section 501. From this information, broadcast information controlling section 501 performs scheduling to transmit the related broadcast information at the same timing in different frequency bands and performs scheduling so that this information continues in the time domain.

Although RACH procedure has been described as an example with the present embodiment, the present invention can be implemented in the same way using other processing (such as handover processing).

With this scheduling reporting method, it is also possible to make the values of the SB in different frequency bands the same. To be more specific, inversion flags are assigned to SIB5 and SIB6, and SIB5 and SIB6 are inverted in a specific frequency band. By such processing, it is possible to learn scheduling information without acquiring the SB in different frequency bands, and, when the mobile station fails to receive required broadcast information, it is possible to shift the frequency voluntarily and perform reception processing.

With regard to the related pair in the broadcast information, specific information components may relate to a plurality of processing. For example, when the broadcast information required for RACH procedure and the broadcast information required for handover are common in part, priority may be assigned to show which should be prioritized. This priority information is managed by broadcast information associating section 601 and outputted to broadcast information controlling section 501, so that it is possible to perform scheduling of broadcast information according to priority.

It is also possible to include MBMS data, that is, multicast and broadcast data, as broadcast information in all the above-described embodiments of the invention. It is also possible to combine two or more embodiments of all the above-described embodiments of the present invention.

Embodiments of the present invention have been described above.

Although a 5 MHz mobile station has been described as the minimum capability mobile station with the above-described embodiments, the minimum capability mobile station may be mobile stations other than the 5 MHz mobile station.

Further, when there is a mobile station having a radio section capable of communicating in a bandwidth of 20 MHz and a baseband section only capable of communicating in a bandwidth of 5 MHz, the present invention can be applied supposing that the minimum communication capability is 5 MHz. Further, when there is a mobile station capable of performing reception in a bandwidth of 20 MHz but only capable of performing transmission in a bandwidth of 5 MHz, the present invention can be applied in the same way supposing that the minimum communication capability is 5 MHz.

Further, although a case has been described with the above-described embodiments where bands FB1 to FB4 continue and are utilized as one band, the present invention is not limited to this. For example, FB1 may be operated in 800 MHz frequency band, FB2 may be operated in 1.5 MHz frequency band, or FB1 and FB2 may be discontinuous different bands.

Further, the content of BCH data may be made different between frequency bands.

Further, the base station, mobile station, subcarrier, cyclic prefix, subframe may be referred to as "Node B," "UE," "tone," "guard interval," and "time slot" or simply "slot," respectively.

Further, although a case where the present invention is implemented by hardware has been explained as an example with the above embodiments, the present invention can also be implemented by software.

Each function block used to explain the above-described embodiments may be typically implemented as an LSI constituted by an integrated circuit. These may be individual chips or may partially or totally contained on a single chip.

Furthermore, here, each function block is described as an LSI, but this may also be referred to as "IC", "system LSI", "super LSI", "ultra LSI" depending on differing extents of integration.

Further, the method of circuit integration is not limited to LSTs, and implementation using dedicated circuitry or general purpose processors is also possible. After LSI manufacture, utilization of a programmable FPGA (Field Programmable Gate Array) or a reconfigurable processor in which connections and settings of circuit cells within an LSI can be reconfigured is also possible.

Further, if integrated circuit technology comes out to replace LSI's as a result of the development of semiconductor technology or a derivative other technology, it is naturally also possible to carry out function block integration using this technology. Application of biotechnology is also possible.

The disclosures of Japanese Patent Application No. 2006-004157, filed on Jan. 11, 2006, and Japanese Patent Application No. 2006-275639, filed on Oct. 6, 2006, including the specifications, drawings and abstracts, are incorporated herein by reference in their entirety.

INDUSTRIAL APPLICABILITY

The present invention is suitable for use as a base station, and the like, used in a mobile communication system.

The invention claimed is:

1. A base station apparatus that communicates with mobile station apparatuses, the base station apparatus comprising:
    a setting section that sets a transmission band, to which a signal addressed to all of the mobile station apparatuses is mapped, to a part of a system bandwidth; and
    a transmitting section that transmits the signal to all of the mobile station apparatuses,
    wherein the setting section changes over time the transmission band in the system bandwidth.

2. A mobile station apparatus that communicates with the base station apparatus according to claim 1, the mobile station apparatus comprising a receiving section that receives the signal, which is transmitted from the base station apparatus, in a band that is set as the transmission band to the part of the system bandwidth by the base station apparatus,
    wherein the band is changed over time in the system bandwidth.

3. A transmission band setting method performed in a base station, the method comprising:
    setting a transmission band, to which a signal addressed to all of mobile stations communicating with the base station is mapped, to a part of a system bandwidth; and
    transmitting the signal to all of the mobile station,
    wherein the transmission band is changed over time the transmission band in the system bandwidth.

4. The base station apparatus according to claim 1, wherein the mobile station apparatuses have respectively different bandwidths for performing communication, and said setting section sets the transmission band to a minimum bandwidth of the different bandwidths.

5. The base station apparatus according to claim 1, wherein said setting section changes the transmission band in accordance with a frequency hopping.

6. The mobile station apparatus according to claim 2, wherein the mobile station apparatus has respectively different bandwidths for performing communication, and said receiving section receives the signal in the band that is set to a minimum bandwidth of the different bandwidths.

7. The mobile station apparatus according to claim 2, wherein said receiving section receives the signal in the band, which is changed in accordance with a frequency hopping.

* * * * *